(12) United States Patent
Kadono et al.

(10) Patent No.: US 7,389,176 B2
(45) Date of Patent: Jun. 17, 2008

(54) ENGINE OUTPUT CONTROL APPARATUS OF POWER TRAIN

(75) Inventors: Ryouji Kadono, Kanagawa (JP);
Masahiro Iriyama, Yokohama (JP);
Tetsuya Fuke, Kanagawa (JP);
Ryouichi Ootaki, Yokohama (JP);
Yusuke Kimura, Tokyo (JP); Tatsuo Ochiai, Kanagawa (JP)

(73) Assignees: Nissan Motor Co., Ltd., Yokohama-shi (JP); JATCO Ltd, Fuji-shi (JP)

( * ) Notice: Subject to any disclaimer, the term of this patent is extended or adjusted under 35 U.S.C. 154(b) by 0 days.

(21) Appl. No.: 11/808,191

(22) Filed: Jun. 7, 2007

(65) Prior Publication Data

US 2007/0288151 A1 Dec. 13, 2007

(30) Foreign Application Priority Data

Jun. 8, 2006 (JP) ............................. 2006-159494

(51) Int. Cl.
*G06F 19/00* (2006.01)
*F02P 5/00* (2006.01)
*B60W 10/10* (2006.01)

(52) U.S. Cl. .................... 701/114; 701/54; 477/111
(58) Field of Classification Search ........... 701/114, 701/110, 115, 102, 51, 54, 55, 57; 477/111, 477/46, 48
See application file for complete search history.

(56) References Cited

U.S. PATENT DOCUMENTS 5,343,990 A * 9/1994 Iizuka ..................... 192/3.31
6,157,885 A * 12/2000 Sakaguchi et al. ......... 704/54
6,181,020 B1 * 1/2001 Uchida et al. .............. 477/47

FOREIGN PATENT DOCUMENTS

| JP | 11-22814 A | * | 1/1999 |
| JP | 11-108170 A | * | 12/2000 |
| JP | 2004-092522 | | 3/2004 |
| JP | 2004-306861 A | * | 11/2004 |

* cited by examiner

*Primary Examiner*—Hieu T Vo
(74) *Attorney, Agent, or Firm*—Foley & Lardner LLP

(57) ABSTRACT

In an engine output control apparatus of a power train employing an engine and an automatic transmission, capable of executing engine output control for excessive torque input prevention engine torque limiting action and for a shift speed control of the transmission, at least two different kinds of engine output control systems having control characteristics differing from each other, are provided. A controller selectively uses these engine output control systems depending on a power-train operating condition, such that a first one of the engine output control systems having a superior transient response is used for the engine output control for shift response control during shifting, and that a second one of the engine output control systems having a superior steady-state stability is used for the engine output control for excessive torque input prevention engine torque limiting action during non-shifting.

12 Claims, 13 Drawing Sheets

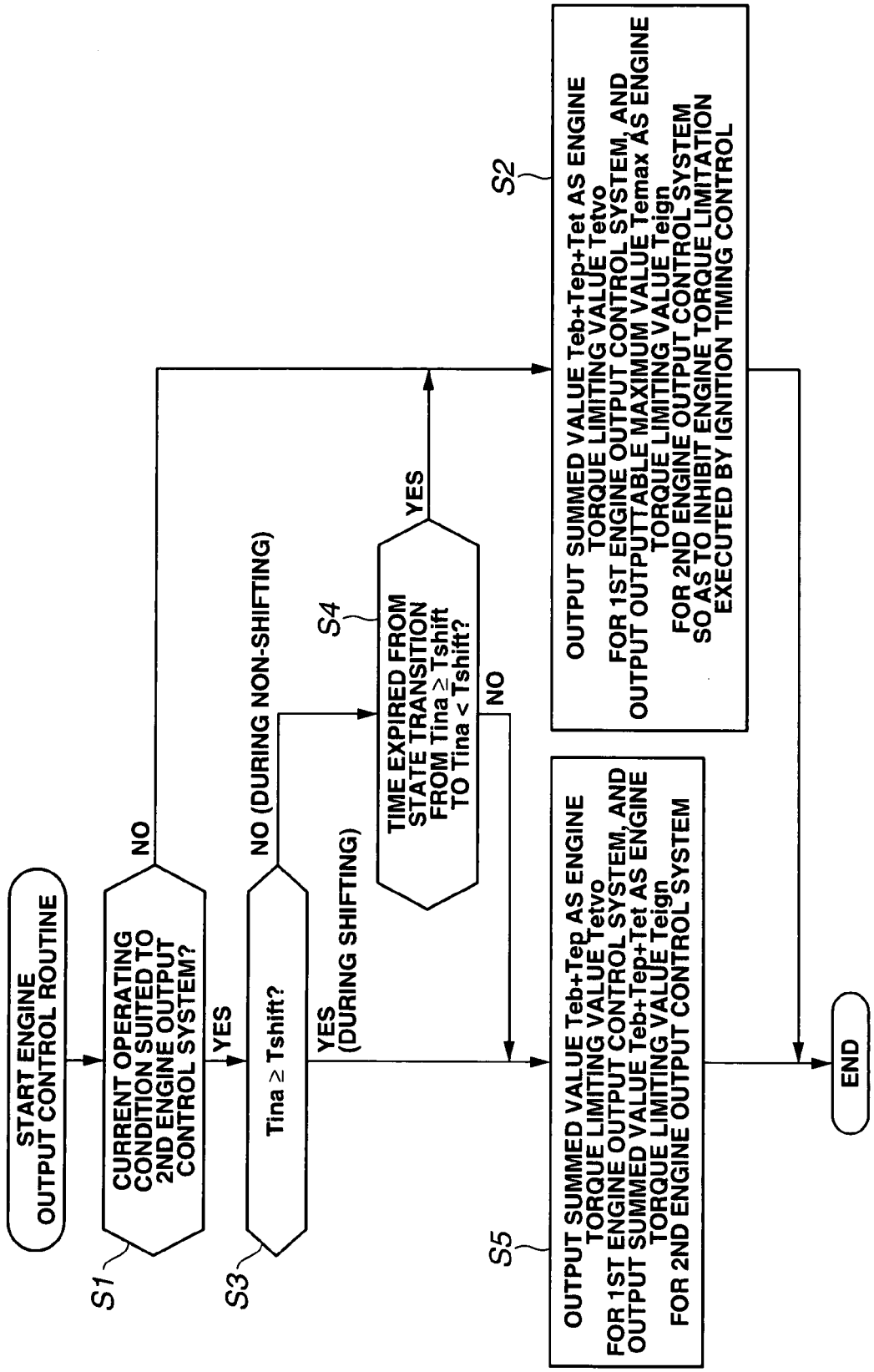

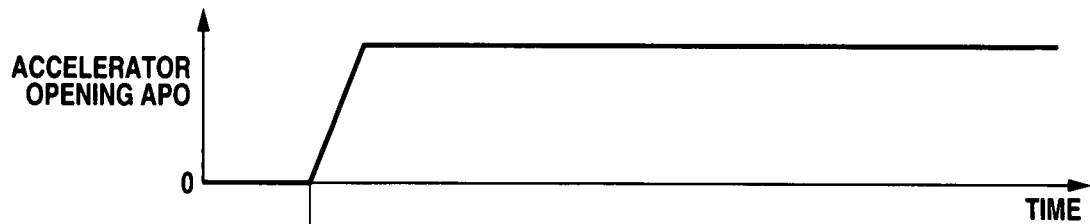
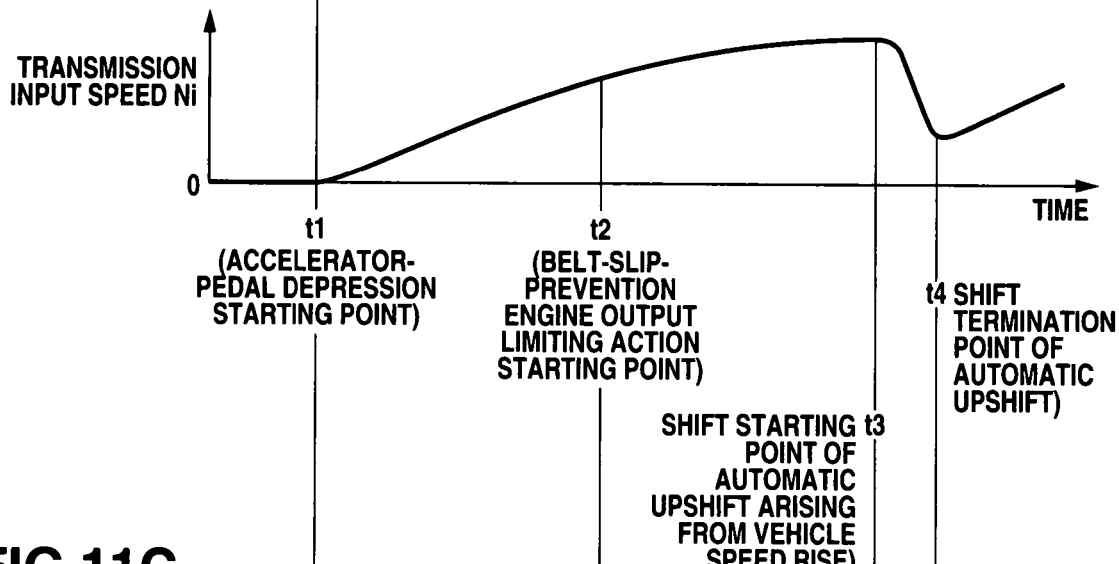
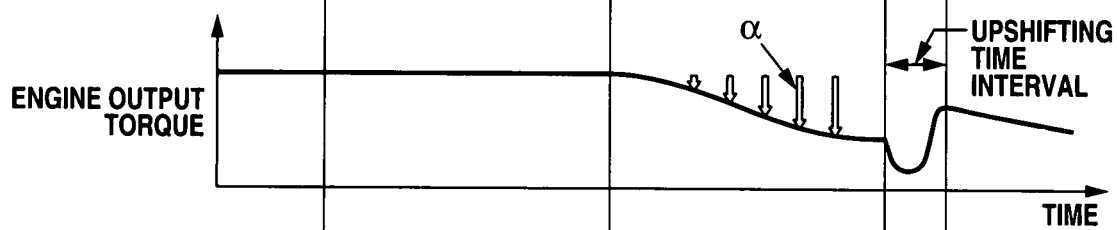
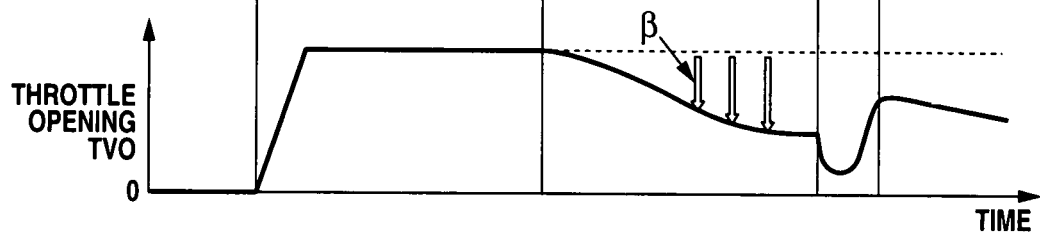

ENGINE OUTPUT CONTROL APPARATUS OF POWER TRAIN

TECHNICAL FIELD

The present invention relates to an engine output control apparatus of a power train employing an engine and an automatic transmission, and specifically to the improvement of an engine output control technology capable of executing engine torque control for preventing the input of an excessive magnitude of torque exceeding a critical torque value (an upper limit of transmittable torque) transmitted through the power train and for controlling a shift speed (a shift response) of the automatic transmission.

BACKGROUND ART

An engine output control apparatus, which executes engine output control for preventing an excessive torque input exceeding an upper limit of transmittable torque transmitted through a power train, has been disclosed in Japanese Patent Provisional Publication No. 2004-092522 (hereinafter is referred to as "JP2004-092522"). The engine output control device disclosed in JP2004-092522 is exemplified in a power train constructed by an engine and a belt-drive continuously variable transmission (CVT). For instance, in a high-engine-load high-engine-speed range (see the hatched area, in other words, the belt-slip-prevention input torque limiting area in a belt-drive CVT shift map illustrated in FIG. 10), there is a possibility that torque cannot be sufficiently transmitted through the power train owing to an undesirable slippage between the segmented steel belt (the drive belt) and primary and secondary pulleys. The undesirable slippage leads to the problem of a deterioration in durability of the belt-drive CVT. In order to prevent such a belt slip, engine power output is limited or restricted by way of a throttle-opening decrease control of an electronically-controlled throttle valve, in other words, a so-called engine torque-down control.

SUMMARY OF THE INVENTION

However, the engine output control device disclosed in JP2004-092522, has the following drawbacks, since engine output limiting action is made by electronically controlling a throttle-opening decrease and the throttle opening control system has a low engine-output-control responsiveness.

In automatic transmissions, in particular, CVTs, engine power output (engine torque) has to be often controlled, for the purpose of a shift speed increase (in other words, an enhanced shift response) in a vehicle-occupant's permissible shift-shock range with negligible shift shocks during shifting.

As seen from time charts of FIGS. 11A-11D, suppose that an accelerator opening APO begins to increase by depression of an accelerator pedal at the time t1 of FIG. 11A, and then engine output limiting action starts from the time t2 so as to prevent a belt slip of the belt-drive CVT. Suppose that an automatic upshift occurs at the time t3 due to a vehicle speed rise, and then the automatic upshift has been completed at the time t4.

After the time t2 at which engine output limiting action starts, as indicated by the arrows "α" in FIG. 11C, the engine output torque falls responsively to an engine output limitation command for belt-slip prevention. To realize the engine output limiting action, a throttle opening TVO is electronically controlled and decreased as indicated by the arrows "β" in FIG. 11D. In this manner, the engine output limiting action for belt-slip prevention is achieved.

During the upshifting time interval from the upshift start point t3 to the upshift termination point t4, in order to rapidly cancel a positive inertia torque generated or released owing to a transmission input speed decrease, and thus to increase a shift speed (an upshift speed), as shown in FIG. 11C an engine output lowering command is generated to further lower or fall the engine torque by a torque value equivalent to the released inertia torque. To realize such a further fall in engine torque, throttle opening TVO is electronically controlled and further decreased (see the concave-up portion of the engine-output characteristic curve during the time interval t3-t4 in FIG. 11D). In this manner, the engine output lowering control for a shift speed increase is achieved.

However, in a similar manner to the engine output limiting control for belt-slip prevention (belt protection), assuming that the engine output lowering control for a shift speed increase is performed by the same throttle opening control system having a relatively low engine-output-control responsiveness, there are the following drawbacks.

As can be seen from time charts of FIGS. 12A-12F, suppose that a transmission ratio, which changes as indicated by the broken line in FIG. 12A in a normal shift control mode, is rapidly changed as indicated by the solid line in FIG. 12A in a shift-speed-increase mode in which a time rate of change in transmission input speed is varied as indicated by the concave-up portion of the transmission-input-speed time rate of change characteristic curve in FIG. 12B from the time t1, and additionally the shift-speed-increase engine output control is performed by way of throttle opening control.

Even when throttle opening TVO is decreased as indicated by the concave-up portion in FIG. 12C from the time t1 during the shift-speed-increase engine output control mode, due to a delay in charging airflow, the actual engine torque does not change according to the target engine torque characteristic curve indicated by the broken line in FIG. 12E (see the remarkable time delay in the actual engine torque characteristic curve indicated by the solid line in FIG. 12E from the target engine torque characteristic curve indicated by the broken line in FIG. 12E). Such a time delay in engine torque drop leads to the problem of an undesirable delay in absorbing action for the released positive inertia torque during the former half of upshifting, and also leads to the problem of excessive absorption of the released positive inertia torque during the latter half of upshifting. The delay in absorbing action for the released positive inertia torque during the former half of upshifting results in a vehicle acceleration rise (see the left-hand side hatched area (the left-hand side shading area) in FIG. 12F), that is, shift shocks having a pop-up feeling of the torque. On the other hand, the excessive absorption of the released positive inertia torque during the latter half of upshifting results in a vehicle acceleration drop (see the right-hand side hatched area (the right-hand side shading area) in FIG. 12F), that is, shift shocks having a pop-down feeling of the torque.

Assuming that (i) belt-slip-prevention engine output limiting action required steadily and (ii) shift-speed-increase engine output lowering control (that is, shift-response-improvement engine torque-down control) required transiently during a shift are both executed by way of the same throttle opening control of a low engine-output-control responsiveness, it is undesirable from the viewpoint of the shift-shock reduction performance. In particular, assuming that shift-speed-increase engine output lowering control (in other words, shift-response-improvement engine output control), required transiently during a shift, is executed by way of throttle opening control, there are some drawbacks, such as shift shocks having a pop-up feeling of the torque during the former half of upshifting and shift shocks having a pop-down feeling of the torque during the latter half of upshifting. Suppose that the transient shift-response-improvement engine output control as discussed previously is eliminated to prevent such undesirable shift shocks, and that only the belt-slip-prevention engine output limiting action required steadily is executed. In such a case, as a matter of course, it is impossible to provide a specified shift response (or a desirable shift response). Anyway, it is difficult to reconcile two contradictory requirements, namely, enhanced shift response and reduced shift shocks (improved shift-shock reduction).

To remarkably enhance the shift response, it is considered to use ignition timing control having a relatively high engine-output-control responsiveness rather than throttle opening control. On the one hand, there is a general relationship between ignition timing and engine output torque, as shown in FIG. 13. The peak of the ignition-timing versus engine-torque characteristic curve of FIG. 13 indicates the basic ignition timing, that is, the minimum advance of best torque, generally abbreviated to "MBT". The magnitude of engine torque tends to reduce in accordance with an increase in an ignition timing retard rate from the "MBT" point. Therefore, engine output control (engine torque limiting action) can be attained by ignition timing change (ignition timing retard). As is generally known, in comparison with engine output control executed by the throttle opening control system (hereinafter is referred to as "throttle-opening-control based engine output control"), engine output control executed by the ignition timing control system (hereinafter is referred to as "ignition-timing-control based engine output control") is superior in engine-output-control responsiveness.

On the other hand, there is a general relationship between ignition-timing-retard duration and exhaust-emission purification medium inlet temperature (for example, catalyst temperature), as shown in FIG. 14, whose characteristics vary depending on a change in ignition timing retard rate, serving as an operating parameter. As can be seen from the characteristics of FIG. 14, the exhaust-emission purification medium inlet temperature tends to gradually rise, as the ignition-timing-retard duration lengthens. The rise in exhaust-emission purification medium inlet temperature results in a deterioration in the catalyst. The degree of deterioration in the catalyst (the exhaust-emission purifier) becomes remarkable, as the ignition timing retard rate increases.

Therefore, the ignition-timing-control based engine output control can be merely used for a short time. Thus, the ignition-timing-control based engine output control is suited to the previously-noted transient shift-response-improvement engine output control, but not suited to the steady belt-slip-prevention engine output limiting action. Thus, it is impossible to reconcile or balance improved transient shift response and steady belt-slip prevention (steady belt protection) by way of the same ignition-timing-control based engine output control.

It is, therefore, in view of the previously-described disadvantages of the prior art, an object of the invention to provide an engine output control apparatus of a power train, which is capable of individually satisfying different kinds of engine output controls, whose required control characteristics differ from each other, by selectively using one or more usable or available systems of different kinds of engine output control systems, including a throttle-opening-control based engine output control system, an ignition-timing-control based engine output control system, and another engine output control systems, fully taking into account their transient responsiveness and steady-state stabilities.

In order to accomplish the aforementioned and other objects of the present invention, an engine output control apparatus of a power train employing an engine and an automatic transmission, capable of executing engine output control for preventing a torque input exceeding an upper limit of transmittable torque transmitted through the power train and for a shift speed control of the transmission, comprises at least two different kinds of engine output control systems, each of which is executable the engine output control, and a controller comprising a usable engine output control system decision circuit provided for making a check for each individual engine output control system enabled/disabled state to specify one or more usable engine output control systems by determining, based on an operating condition of the power train, whether the engine output control systems can be individually used for the engine output control to be executed for excessive torque input prevention engine torque limiting action and for shift response control by which a shift speed increase is achieved during shifting, and an engine output control system selection circuit provided for using a first one of the usable engine output control systems having a superior transient response for the engine output control that requires a control response rather than a control stability, and for using a second one of the usable engine output control systems having a superior steady-state stability for the engine output control that requires the control stability rather than the control response.

According to another aspect of the invention, an engine output control apparatus of a power train employing an engine and an automatic transmission, capable of executing engine output control for preventing a torque input exceeding an upper limit of transmittable torque transmitted through the power train and for a shift speed control of the transmission, comprises at least two different kinds of engine output control systems, each of which is executable the engine output control, and a controller comprising usable engine output control system decision means for making a check for each individual engine output control system enabled/disabled state to specify one or more usable engine output control systems by determining, based on an operating condition of the power train, whether the engine output control systems can be individually used for the engine output control to be executed for excessive torque input prevention engine torque limiting action and for shift response control by which a shift speed increase is achieved during shifting, and engine output control system selection means for using a first one of the usable engine output control systems having a superior transient response for the engine output control that requires a control response rather than a control stability, and for using a second one of the usable engine output control systems having a superior steady-state stability for the engine output control that requires the control stability rather than the control response.

According to a further aspect of the invention, a method of limiting torque transmitted through a power train employing an engine and an automatic transmission, for executing engine output control for excessive torque input prevention engine torque limiting action that prevents a torque input exceeding an upper limit of transmittable torque transmitted through the power train and for shift response control by which a shift speed increase of the automatic transmission is achieved during shifting, comprises providing at least two different kinds of engine output control systems, each of which is executable the engine output control, making a check for each individual engine output control system enabled/disabled state to specify one or more usable engine output control systems by determining, based on an operating condition of the power train, whether the engine output control systems can be individually used for the engine output control to be executed for excessive torque input prevention engine torque limiting action and for shift response control, selecting a first one of the usable engine output control systems having a superior transient response as the engine output control system for shift response control, and selecting a second one of the usable engine output control systems having a superior steady-state stability as the engine output control system for excessive torque input prevention torque limiting action.

According to a still further aspect of the invention, a method of limiting torque transmitted through a power train employing an engine and an automatic transmission, for executing engine output control for excessive torque input prevention engine torque limiting action that prevents a torque input exceeding an upper limit of transmittable torque transmitted through the power train and for shift response control by which a shift speed increase of the automatic transmission is achieved during shifting, comprises providing at least two different kinds of engine output control systems comprising at least a throttle opening control system having a superior steady-state stability, and an ignition timing control system having a superior transient response, making a check for an engine output control system enabled/disabled state for the ignition timing control system to determine, based on an operating condition of the power train, whether the ignition timing control system is enabled or disabled for the engine output control to be executed for excessive torque input prevention engine torque limiting action and for shift response control, commanding the throttle opening control system having the superior steady-state stability to execute both the engine output control for shift response control and the engine output control for excessive torque input prevention engine torque limiting action, when it is determined that the ignition timing control system is disabled, and commanding the ignition timing control system having the superior transient response to execute the engine output control for shift response control, and commanding the throttle opening control system having the superior steady-state stability to execute the engine output control for excessive torque input prevention engine torque limiting action, when it is determined that the ignition timing control system having the superior transient response is enabled.

According to another aspect of the invention, a method of limiting torque transmitted through a power train employing an engine and an automatic transmission, for executing engine output control for excessive torque input prevention engine torque limiting action that prevents a torque input exceeding an upper limit of transmittable torque transmitted through the power train and for shift response control by which a shift speed increase of the automatic transmission is achieved during shifting, comprises providing different kinds of engine output control systems comprising a throttle opening control system having a superior steady-state stability, an ignition timing control system having a superior transient response, and at least one of a fuel-supply rate control system, an intake-and-exhaust valve lift characteristic control system, and an effective compression ratio control system, each having an intermediate control characteristic between the throttle opening control system and the ignition timing control system, making a check for each individual engine output control system enabled/disabled state to specify one or more usable engine output control systems by determining, based on an operating condition of the power train, whether the engine output control systems can be individually used for the engine output control to be executed excessive torque input prevention engine torque limiting action and for shift response control, commanding the throttle opening control system having the superior steady-state stability to execute both the engine output control for shift response control and the engine output control for excessive torque input prevention engine torque limiting action, when it is determined that only the throttle opening control system is enabled, commanding the ignition timing control system having the superior transient response to execute the engine output control for shift response control, and commanding the throttle opening control system having the superior steady-state stability to execute the engine output control for excessive torque input prevention engine torque limiting action, when it is determined that the ignition timing control system and the throttle opening control system are both enabled, commanding the fuel-supply rate control system having the intermediate control characteristic to execute the engine output control for shift response control, and commanding the throttle opening control system having the superior steady-state stability to execute the engine output control for excessive torque input prevention engine torque limiting action, when it is determined that the fuel-supply rate control system and the throttle opening control system are both enabled, commanding the intake-and-exhaust valve lift characteristic control system having the intermediate control characteristic to execute both the engine output control for shift response control and the engine output control for excessive torque input prevention engine torque limiting action, when it is determined that only the intake-and-exhaust valve lift characteristic control system is enabled, and commanding the effective compression ratio control system having the intermediate control characteristic to execute both the engine output control for shift response control and the engine output control for excessive torque input prevention engine torque limiting action, when it is determined that only the effective compression ratio control system is enabled.

The other objects and features of this invention will become understood from the following description with reference to the accompanying drawings.

BRIEF DESCRIPTION OF THE DRAWINGS

FIG. 2 is a flow chart showing an engine output control routine (an engine output limiting control program) executed within a transmission controller incorporated in the engine output control apparatus of the embodiment.

FIGS. 11A-11D are operational time charts obtained when executing belt-protection engine output limiting control and shift-response-improvement engine output control by the same throttle-opening-control based engine output control system.

DESCRIPTION OF THE PREFERRED EMBODIMENTS

Figure 1:
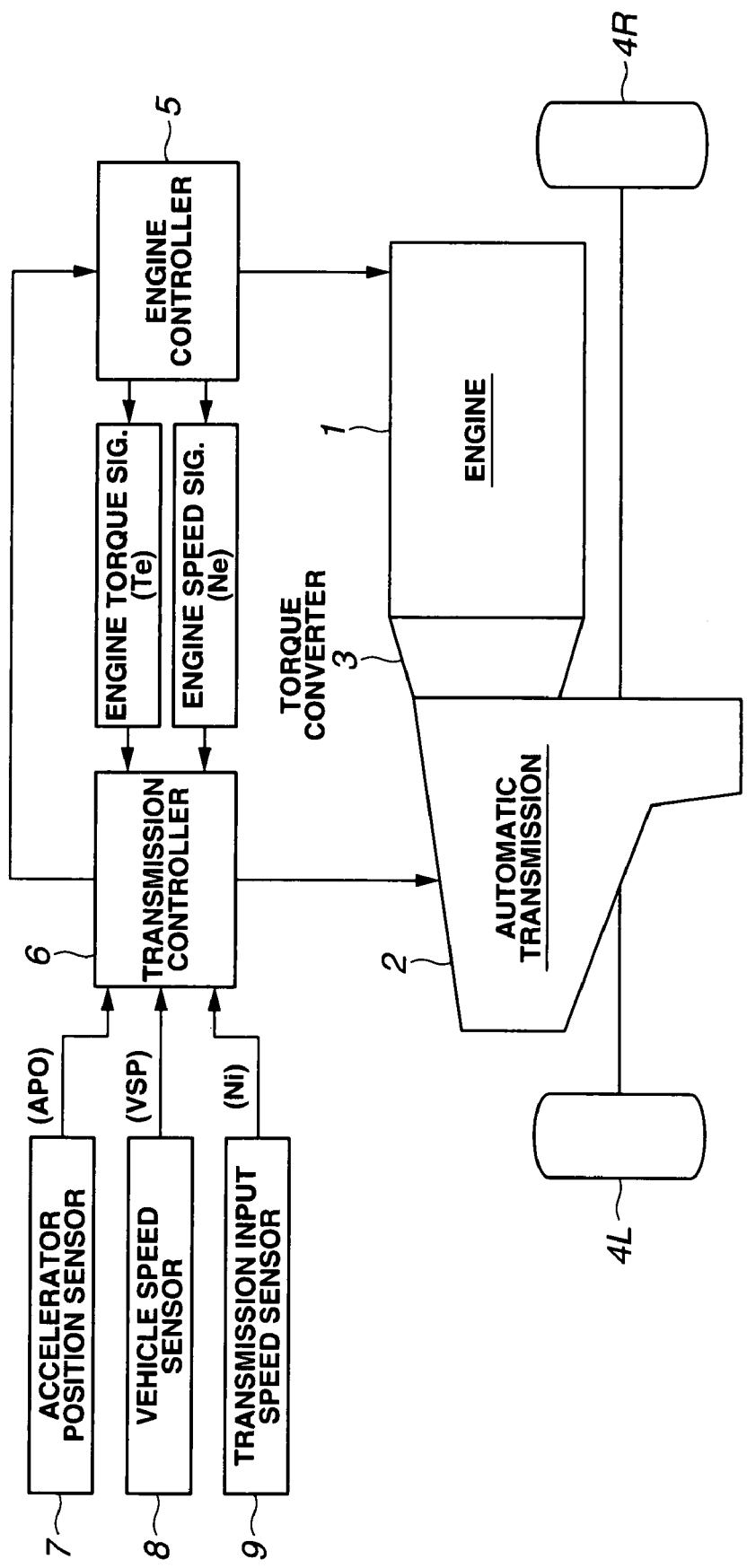
FIG. 1 is a system diagram illustrating an embodiment of an engine output control apparatus, which is applicable to a vehicular power train employing an engine and an automatic transmission.

Referring now to the drawings, particularly to FIG. 1, the engine output control apparatus of the embodiment is exemplified in a power train of an automotive vehicle employing both an engine 1 and an automatic transaxle in which an automatic transmission 2 and a differential gear are combined with each other as a unit. As seen in FIG. 1, a coupling/uncoupling device 3 is disposed between engine 1 and automatic transmission 2 for performing coupling and uncoupling actions between the engine and the transmission. In the shown embodiment, a torque converter is used as coupling/uncoupling device 3, whereas a continuously variable transmission, abbreviated to "CVT", such as a belt-drive CVT or a toroidal CVT is used as automatic transmission 2. Instead of using such a torque converter, an electromagnetic clutch may be used as coupling/uncoupling device 3. Instead of using such a CVT, a stepped automatic transmission, whose number of speeds is limited or finite, may be used. Front-left and front-right drive wheels 4L, 4R are fixedly connected to respective output axle-shafts of the transaxle (automatic transmission 2) via the differential gear.

In the case of the power train shown in FIG. 1, power (driving torque) produced by engine 1 is input from coupling/uncoupling device 3 into automatic transmission 2. Then, the transmission input speed of automatic transmission 2 is varied depending on the selected transmission ratio. In other words, the transmission input torque is varied depending on the selected transmission ratio. The transmission output torque (the driving torque after shifting) is transferred via the differential gear to front-left and front-right drive wheels 4L-4R for vehicle propulsion.

Although it is not clearly shown in FIG. 1, engine 1 employs an electronically-controlled throttle valve installed in an intake pipe of an induction system. Basically, throttle opening TVO of the electronically-controlled throttle valve varies depending on an accelerator-pedal depression degree (an accelerator opening) APO. Actually, throttle opening TVO of the electronically-controlled throttle valve can be increased or decreased appropriately in response to a demand for engine power (torque) output control, irrespective of the accelerator opening APO. Thus, a so-called torque-down (torque-decrease) compensation for engine torque or a so-called torque-up (torque-increase) compensation for engine torque can be achieved by decreasing or increasing throttle opening TVO. Within the engine 1, an air-fuel mixture of air of an intake-air flow rate properly controlled by the throttle valve and fuel sprayed by a fuel injector is spark-ignited by means of a spark plug to run the engine.

An engine controller 5 coordinates various engine control functions. For instance, engine controller 5 executes intake-and-exhaust valve lift characteristic control for each of intake and exhaust valves, valve open timing and valve closure timing control for effective compression ratio control, and the like. Additionally, engine controller 5 executes electronic throttle opening control for the electronically-controlled throttle valve, electronic fuel-injection control (or electronic fuel-supply rate control for an electronically-controlled injector of an electronic fuel-injection system), and electronic ignition timing control for a spark plug of an electronic ignition system. The central processing unit (CPU) of engine controller 5 is responsible for carrying the control program of each of the above-mentioned engine controls and is capable of performing necessary arithmetic and logic operations. Computational results (arithmetic calculation results), that is, calculated output signals are relayed through the output interface circuitry of engine controller 5 to output stages. A desired engine power output (target engine torque tTe) is also calculated or determined within engine controller 5, coordinating these engine control functions.

As discussed above, the engine output control apparatus of the embodiment has the first engine output control system based on throttle opening control (i.e., the throttle-opening-control based engine output control system), the second engine output control system based on ignition timing control (i.e., the ignition-timing-control based engine output control system), the third engine output control system based on fuel-supply rate control, the fourth engine output control system based on intake-and-exhaust valve lift characteristic control, and the fifth engine output control system based on effective compression ratio control.

Characters and qualities of the previously-noted five engine output control systems are as follows:

Regarding the $1^{st}$ engine output control system based on throttle opening control, there is a less limitation for execution time duration or running duration. The $1^{st}$ engine control system has a high steady-state stability, but has a low engine-output-control responsiveness.

Regarding the $2^{nd}$ engine output control system based on ignition timing control, the $2^{nd}$ engine control system has a high engine-output-control responsiveness, but there is a limitation for execution time duration or running duration from the viewpoint of protection for an exhaust-emission purification medium (an exhaust gas purification catalyst), whose life tends to deteriorate owing to a catalyst temperature rise arising from the ignition timing retardation.

Regarding the other three engine output control systems, namely, the $3^{rd}$ engine output control system based on fuel-supply rate control, the $4^{th}$ engine output control system based on intake-and-exhaust valve lift characteristic control, and the $5^{th}$ engine output control system based on effective compression ratio control, each of these control systems has an intermediate engine-output-control responsiveness (or an intermediate control characteristic) between the throttle-opening-control based engine output control system of a low engine torque control responsiveness and the ignition-timing-control based engine output control system of a high engine torque control responsiveness. Thus, in each of the $3^{rd}$ to $5^{th}$ engine output control systems, there is a less limitation for execution time duration (for running duration), but these control systems have concern about a deterioration in exhaust performance.

The operation of automatic transmission 2 is controlled by a transmission controller 6. Transmission controller 6 generally comprises a microcomputer. Transmission controller 6 includes an input/output interface (I/O), memories (RAM, ROM), and a microprocessor or a central processing unit (CPU). The input/output interface (I/O) of transmission controller 6 receives input informational data signals from engine controller 5 (regarding engine torque Te and engine speed Ne). The I/O of transmission controller 6 also receives input information from various engine/vehicle sensors, namely an accelerator position sensor (an accelerator opening sensor) 7, a vehicle speed sensor 8, and a transmission input speed sensor 9. Accelerator position sensor 7 detects the accelerator-pedal depression degree (accelerator opening) APO. Vehicle speed sensor 8 detects vehicle speed VSP. Transmission input speed sensor 9 detects transmission input speed Ni (an actual transmission input speed). Although it is not clearly shown in the drawings, a throttle position sensor is also provided for detecting throttle opening TVO (actual throttle opening) of the electronically-controlled throttle valve, and a transmission output speed sensor is also provided for detecting transmission output speed No (an actual transmission output speed). The actual transmission ratio is calculated as a ratio (Ni/No) of transmission input speed Ni to transmission output speed No. The transmission ratio may be estimated by a ratio of transmission input speed Ni to vehicle speed VSP (regarded as transmission output speed No).

During an automatic shift mode for automatic transmission 2, transmission controller 6 determines, based on the input information, a target transmission input speed of automatic transmission 2, from a predetermined shift map defining a preprogrammed shift sequence. Thereafter, transmission controller 6 executes automatic shift control for automatic transmission 2 such that the actual transmission input speed is brought closer to the target transmission input speed with a predetermined response (in other words, at a controlled time rate of change in transmission ratio or a controlled shifting speed).

Furthermore, transmission controller 6 executes the engine torque control program (the engine output control routine) shown in FIG. 2. For the purpose of executions of (i) engine output control for power-train protection (i.e., belt-slip prevention of automatic transmission 2) and (ii) engine output control for shift response improvement (simply, shift response control) that the invention assumes an aim, transmission controller 6 generates an engine output control command to engine controller 5.

For the purpose of simplification of the disclosure, in the control program shown in FIG. 2, the $2^{nd}$ engine output control system based on ignition timing control (having a superior transient engine-output-control responsiveness (simply, a superior transient response) but with a limitation for execution time) and the $1^{st}$ engine output control system based on throttle opening control (having a superior steady-state stability but a low engine-output-control responsiveness) will be assumed as engine output control systems applied to automatic-transmission protection (i.e., belt-slip prevention) and shift speed improvement (shift response enhancement) in the following discussion.

Referring now to FIG. 2, there is shown the engine output control routine executed within the engine output control apparatus having two different control systems, namely, the $1^{st}$ engine output control system based on throttle opening control and the $2^{nd}$ engine output control system based on ignition timing control. The engine output control routine shown in FIG. 2 is executed as time-triggered interrupt routines to be triggered every predetermined time intervals (every predetermined control cycles).

First, at step S1, a check is made to determine whether the current power-train operating condition corresponds to an operating condition suited to the use of the $2^{nd}$ engine output control system (the ignition-timing-control based engine output control system). Step S1 serves as a usable engine output control system decision means.

As described previously in reference to FIGS. 13-14, assuming that the engine output control fully depends on ignition timing control, on the one hand, it is possible to attain engine output limiting action with a high control response by way of ignition timing control (see FIG. 13). On the other hand, there is an increased tendency for the exhaust gas purification catalyst to deteriorate early owing to a catalyst temperature rise (see FIG. 14) arising from ignition timing retardation. This catalyst deterioration tendency becomes remarkable, as the ignition timing retard rate increases and/or as the ignition-timing-retard duration lengthens. For the reasons discussed above, actually, such a check for the operating condition suited to the use of the $2^{nd}$ engine output control system based on ignition timing control is made based on the ignition-timing-retard duration and the ignition timing retard rate.

When the answer to step S1 is in the negative (NO), that is, when the current operating condition is unsuitable for the use of the $2^{nd}$ engine output control system based on ignition timing control, the routine proceeds to step S2. Conversely when the answer to step S1 is in the affirmative (YES), that is, when the current operating condition is suitable for the use of the $2^{nd}$ engine output control system based on ignition timing control, the routine proceeds to step S3.

At step S2, as an engine torque limiting value Tetvo for the $1^{st}$ engine output control system based on throttle opening control, a summed value (Teb+Tep+Tet) of an engine torque limiting value Teb for automatic-transmission protection (i.e., for belt-slip prevention of belt-drive CVT 2), a shift-control oil pump (O/P) loss torque correction value Tep, and an inertia torque correction value Tet is commanded from transmission controller 6 to engine controller 5. The engine torque limiting value Teb for automatic-transmission protection is preset to a critical torque value (an upper limit of transmittable torque values) transmitted through the segmented steel belt of the CVT. The inertia torque correction value Tet is needed to control a shift speed (a shift response) by cancellation of an inertia torque Tina generated during shifting. At the same time, at step S2, an engine torque limiting value Teign for the $2^{nd}$ engine output control system based on ignition timing control is set to an outputtable maximum torque value Temax, and then a control command signal corresponding to engine torque limiting value Teign, set to outputtable maximum torque value Temax, is generated from transmission controller 6 to engine controller 5. As a result of this, engine torque limiting action based on ignition timing control is actually inhibited, and in lieu thereof the electronic ignition timing control system operates in a normal ignition timing control mode. Step S2 serves as an engine output control system selection means.

At step S3, a check is made to determine whether inertia torque Tina generated owing to a transmission input speed change during shifting is greater than or equal to a preset shifting-decision threshold value Tshift. The shifting-period inertia torque Tina is arithmetically calculated by multiplying a time rate of change $\Delta Ni/\Delta t$ in transmission input speed Ni during shifting with moments of inertia of rotating masses of the power train. The state of inertia torque Tina greater than or equal to preset shifting-decision threshold value Tshift, that is, the state defined by the inequality Tina$\geq$Tshift means a shifting period during which a shift speed (i.e., a shift response) should be controlled. In the shown embodiment, the shifting-period inertia torque Tina is set to be different depending on a transmission ratio (an actual transmission ratio and/or a target transmission ratio). It is preferable that a higher one of an absolute value of inertia torque derived from the target transmission ratio and an absolute value of inertia torque derived from the actual transmission ratio is set as the shifting-period inertia torque Tina by way of a so-called "select-HIGH process". When the answer to step S3 is negative (NO), that is, when Tina<Tshift, the routine proceeds from step S3 to step S4.

At step S4, a check is made to determine whether a set time (a predetermined elapsed time) TMs has expired from the point of time when a state transition from the state of Tina$\geq$Tshift to the state of Tina<Tshift has occurred.

When the answer to step S4 is affirmative (YES), that is, when the set time TMs has expired from the point of time when the shifting-period inertia torque Tina becomes less than the preset shifting-decision threshold value Tshift, the routine proceeds from step S4 to step S2. As previously described, through step S2, engine torque limiting value Tetvo for the $1^{st}$ engine output control system based on throttle opening control is calculated or determined as the summed value (Teb+Tep+Tet) and then a control command signal corresponding to the calculated engine torque limiting value Tetvo (=Teb+Tep+Tet) is output to engine controller 5. Simultaneously, through step S2, engine torque limiting value Teign for the $2^{nd}$ engine output control system based on ignition timing control is set to the outputtable maximum value Temax and then a torque-limitation inhibition command is generated from transmission controller 6 to engine controller 5, so as to inhibit engine torque limiting action based on ignition timing control.

When the answer to step S3 is affirmative (Tina$\geq$Tshift, that is, during shifting), or when the answer to step S4 is negative (that is, when the set time TMs has not yet expired from the transition point from Tina$\geq$Tshift to Tina<Tshift), the routine proceeds to step S5. In a similar manner to step S2, step S5 serves as an engine output control system selection means. Through step S5, engine torque limiting value Tetvo for the $1^{st}$ engine output control system based on throttle opening control and engine torque limiting value Teign for the $2^{nd}$ engine output control system based on ignition timing control are both determined as follows.

Concretely, at step S5, as an engine torque limiting value Tetvo for the $1^{st}$ engine output control system based on throttle opening control, a summed value (Teb+Tep) of engine torque limiting value Teb for automatic-transmission protection (i.e., for belt-slip prevention of belt-drive CVT 2) and shift-control oil pump (O/P) loss torque correction value Tep is commanded from transmission controller 6 to engine controller 5. At the same time, at step S5, as an engine torque limiting value Teign for the $2^{nd}$ engine output control system based on ignition timing control, a summed value (Teb+Tep+Tet) of engine torque limiting value Teb for automatic-transmission protection (i.e., for belt-slip prevention of belt-drive CVT 2), shift-control oil pump (O/P) loss torque correction value Tep, and inertia torque correction value Tet is commanded from transmission controller 6 to engine controller 5, so as to initiate engine torque limiting action based on ignition timing control.

Referring now to FIGS. 3A-3G, there are shown the operational time charts obtained by the engine output control apparatus of the embodiment during upshifting.

When step S1 of FIG. 2 determines that the ignition-timing-control based engine output control (the $2^{nd}$ engine output control) is disabled (unsuitable for the current power-train operating condition), or during non-shifting before the time t1 (i.e., before shifting-start decision time t1 shown in FIGS. 3A-3G) even under the $2^{nd}$ engine output control enabling state, or during non-shifting after the time t2 (i.e., after shifting-termination decision time t2, exactly, after a time-expired point t3, described later in reference to step S4 of FIG. 2 and related to FIG. 4E) even under the $2^{nd}$ engine output control enabling state, the routine of FIG. 2 proceeds to step S2. Through step S2, engine torque limiting value Tetvo for the $1^{st}$ engine output control system based on throttle opening control is set to the summed value (Teb+Tep+Tet) of engine torque limiting value Teb for automatic-transmission protection (i.e., for belt-slip prevention of belt-drive CVT 2), shift-control O/P loss torque correction value Tep, and inertia torque correction value Tet needed to control a shift speed (i.e., a shift response) by cancellation of inertia torque Tina generated during shifting, that is, Tetvo=Teb+Tep+Tet. During non-shifting, the shifting-period inertia torque correction value Tet is equal to "0", that is, Tet=0. Simultaneously, through step S2, engine torque limiting value Teign for the $2^{nd}$ engine output control system based on ignition timing control is set to the outputtable maximum value Temax, that is, Teign=Temax, so as to inhibit engine torque limiting action based on ignition timing control.

Conversely when step S1 of FIG. 2 determines that the ignition-timing-control based engine output control (the $2^{nd}$ engine output control) is enabled (suitable for the current power-train operating condition), or when steps S3-S4 determine that the automatic transmission is in its shifting state, that is, during the shifting period t1-t2 in FIGS. 3A-3G, the routine of FIG. 2 proceeds to step S5. Through step S5, engine torque limiting value Tetvo for the $1^{st}$ engine output control system based on throttle opening control is set to the summed value (Teb+Tep) of engine torque limiting value Teb for automatic-transmission protection (i.e., for belt-slip prevention of belt-drive CVT 2), and shift-control O/P loss torque correction value Tep, that is, Tetvo=Teb+Tep. Simultaneously, through step S5, engine torque limiting value Teign for the $2^{nd}$ engine output control system based on ignition timing control is set to the summed value (Teb+Tep+Tet) of engine torque limiting value Teb for automatic-transmission protection (i.e., for belt-slip prevention of belt-drive CVT 2), shift-control O/P loss torque correction value Tep, and inertia torque correction value Tet needed to control a shift speed (i.e., a shift response) by cancellation of inertia torque Tina generated during shifting, that is, Teign=Teb+Tep+Tet.

Figure 3A:
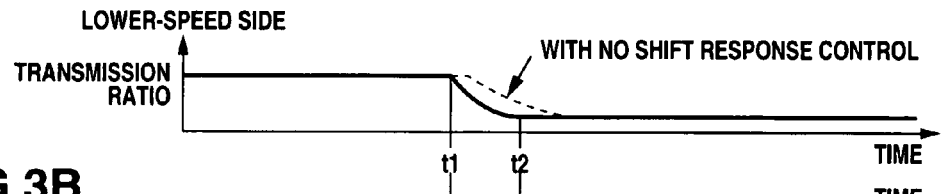
FIGS. 3A-3G are operational time charts of the engine output control apparatus of the embodiment shown in FIG. 2, during an upshift.
Figure 3B:
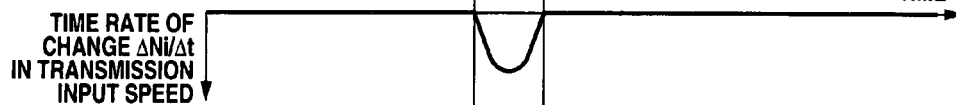

Hereupon, inertia torque correction value Tet is set to an engine torque correction value that the time rate of change $\Delta Ni/\Delta t$ in transmission input speed Ni is varied as shown in FIG. 3B, by increasing the shift speed such that a transmission ratio, which ratio changes as indicated by the broken line in FIG. 3A in a normal shift control mode with no shift-response-improvement engine output control (simply, with no shift response control), is changed as indicated by the solid line in FIG. 3A during shifting (during the time period t1-t2 from shifting-start decision time t1 to shifting-termination decision time t2 in FIGS. 3A-3G).

Engine torque limiting value Tetvo for the $1^{st}$ engine output control system based on throttle opening control and engine torque limiting value Teign for the $2^{nd}$ engine output control system based on ignition timing control, both determined as discussed above, are commanded from transmission controller 6 to engine controller 5. Engine controller 5 is responsive to these command signals respectively indicative of the determined engine torque limiting values Tetvo and Teign, for controlling throttle opening TVO as shown in FIG. 3D and for controlling ignition timing as shown in FIG. 3E.

Figure 3C:
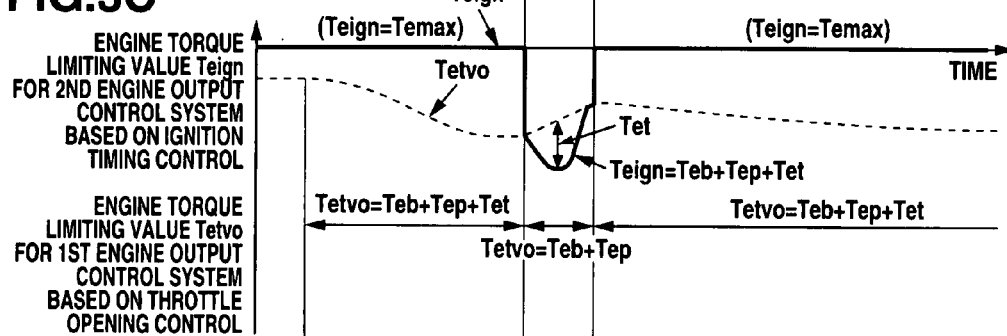
Figure 3D:
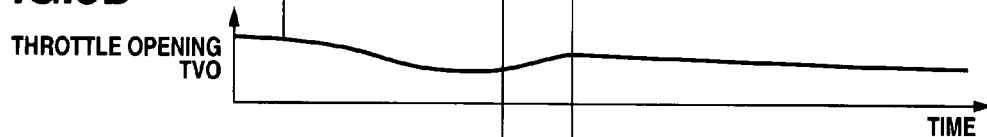
Figure 3E:
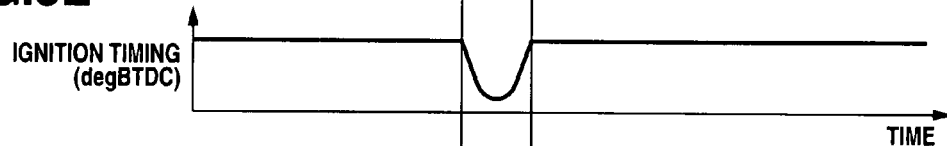
Figure 3F:
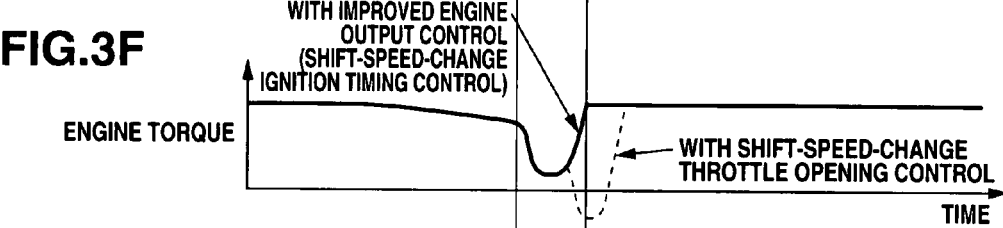
Figure 3G:
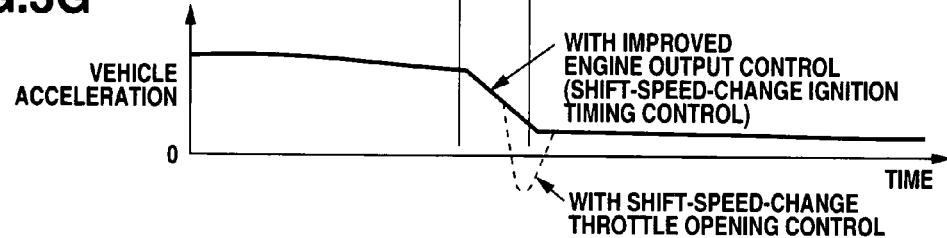

According to the improved engine output control of the embodiment, as can be seen from the time chart of FIG. 3C, engine torque limiting value Tetvo for the $1^{st}$ engine output control system based on throttle opening control and engine torque limiting value Teign for the $2^{nd}$ engine output control system based on ignition timing control become identical to each other at the shifting-start decision time t1 and at the shifting-termination decision time t2. On the one hand, the shifting-period inertia torque correction value Tet needed for shift response improvement (i.e., shift speed increase) by cancellation of inertia torque Tina generated during the shifting period t1-t2, can be achieved by way of the $2^{nd}$ engine output control system based on ignition timing control having a high engine-output-control responsiveness. On the other hand, engine torque limiting value Teb for automatic-transmission protection (i.e., for belt-slip prevention of belt-drive CVT 2) and shift-control O/P loss torque correction value Tep can be both achieved by way of the $1^{st}$ engine output control system based on throttle opening control having a high steady stability.

That is to say, according to the control apparatus of the embodiment shown in FIG. 2, in executing engine output control (engine torque control) for preventing an excessive torque input exceeding the upper limit of transmittable torque transmitted through the power train, in particular, through the drive belt of the CVT), and for changing a shift speed of automatic transmission 2, the $1^{st}$ engine output control system based on throttle opening control having a high steady stability and the $2^{nd}$ engine output control system based on ignition timing control having a high engine-output-control responsiveness are provided as different kinds of engine output control systems (engine output control means). Additionally, a check for each individual engine output control system enabled/disabled state is made to specify one or more usable engine output control systems by determining, based on the current power-train operating condition, whether these different kinds of engine output control systems can be individually used for the aforesaid engine output control to be executed for shift-response-improvement engine output control and for belt-protection (belt-slip-prevention) engine output limiting control. Of these usable engine output control systems, the $2^{nd}$ engine output control system based on ignition timing control having a superior transient control responsiveness is used for the engine output control for shift speed control (i.e., shift response control) that requires a high control responsiveness. On the other hand, the $1^{st}$ engine output control system based on throttle opening control having a superior steady stability is used for the engine output control for belt-slip prevention (belt protection) that requires a long-term stability.

As set forth above, the control apparatus of the embodiment shown in FIG. 2 has two different engine output control systems, namely, the $1^{st}$ engine output control system based on throttle opening control suited to the prevention of an excessive torque input exceeding the upper limit of transmittable torque transmitted through the power train) for belt-slip prevention, and the $2^{nd}$ engine output control system based on ignition timing control suited to shift response control. But, the two different engine output control systems never executes the same engine torque control (either belt-protection engine output control or shift-response-improvement engine output control) doubly or simultaneously. That is, there is no interference between the $1^{st}$ and $2^{nd}$ engine output control systems, for the same engine torque control. More concretely, the engine output control apparatus of the embodiment provides the following operation and effects.

As previously described by reference to the time charts of FIGS. 12A-12F, assuming that engine output control for belt-slip prevention (for belt protection) and engine output control for shift speed control (i.e., shift response control) are both executed by means of the same $1^{st}$ engine output control system (the throttle opening control system), there are the following drawbacks. That is, owing to a response delay in the throttle-opening-control based engine output control system of a low engine-output-control responsiveness, it is difficult to provide a sufficient transient response required for shift speed control (i.e., shift response control). Thus, as can be seen from the engine torque characteristic curve indicated by the broken line in FIG. 3F, in the case of the shift-speed-change engine output limiting control based on throttle opening control, an actual engine torque drop tends to occur with a time delay from the shift timing. This results in a remarkable vehicle acceleration drop as indicated by the broken line in FIG. 3G, thus causing undesirable shift shocks.

In contrast, according to the control apparatus of the embodiment, engine output control for belt-slip prevention (for belt protection) is achieved by way of the $1^{st}$ engine output control system based on throttle opening control having a superior steady stability, whereas engine output control for shift speed control (i.e., shift response control) is achieved by way of the $2^{nd}$ engine output control system based on ignition timing control having a superior transient control responsiveness. Thus, an engine torque change occurs without any time delay from the shift timing (see the engine torque characteristic curve indicated by the solid line in FIG. 3F). Thus, a moderate vehicle acceleration characteristic is obtained (see the vehicle acceleration characteristic indicated by the solid line in FIG. 3G), and thus there is a less shift shock. Therefore, in the control apparatus of the embodiment of FIG. 2, it is possible to high-dimensionally reconcile or balance belt-slip-prevention engine output control (belt-protection engine output control) and shift-speed-change engine output control (shift-response-improvement engine output control).

Referring now to FIGS. 4A-4G, there are shown the operational time charts concerning details of shifting-decision (e.g., shifting-start decision time t1 and shifting-termination decision time t2), and the improved engine output control executed, based on the shifting-decision results, by the engine output control apparatus of the embodiment.

According to the control apparatus of the embodiment, the processor (i.e., step S3 of FIG. 2) of the transmission controller recognizes that the point of time t1 of FIGS. 4A-4G when it is determined that the shifting-period inertia torque Tina (the product obtained by multiplying the time rate of change $\Delta Ni/\Delta t$ in transmission input speed Ni during shifting with moments of inertia of rotating masses of the power train) becomes greater than or equal to preset shifting-decision threshold value Tshift, is a starting point of a shift that a shift speed (a shift response) should be controlled. The processor (i.e., step S3 of FIG. 2) of the transmission controller recognizes that the point of time t2 of FIGS. 4A-4G when it is determined that the shifting-period inertia torque Tina becomes less than preset shifting-decision threshold value Tshift, is a shift termination point (or a shift completion point). Also, the processor (i.e., step S4 of FIG. 2) determines or recognizes that a time interval t1-t3 from shifting-start decision time t1 to the time (the time-expired point) t3 of FIGS. 4A-4G when set time TMs has expired from shifting-termination decision time t2 (i.e., the transition point from Tina≧Tshift to Tina<Tshift), is a shift-speed-control time length (or a shift-response-control time period) during which a high transient response is continually required.

Figure 4A:
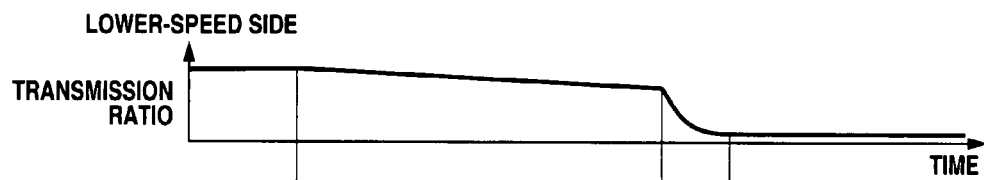
FIGS. 4A-4G are operational time charts showing merits obtained by the engine output control shown in FIG. 2.
Figure 4B:
Figure 4C:
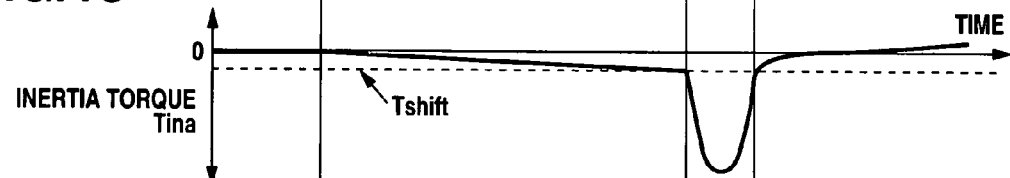
Figure 4D:
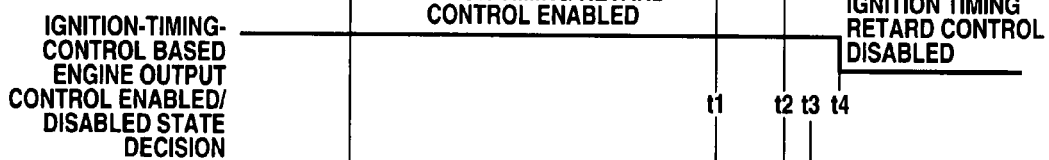
Figure 4E:
Figure 4F:
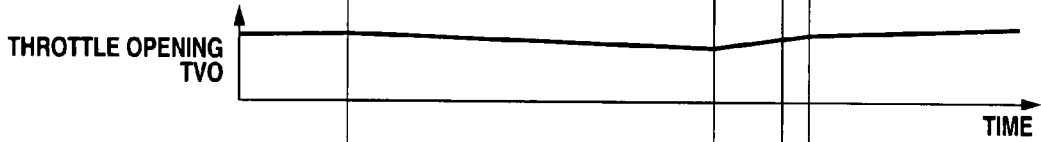
Figure 4G:
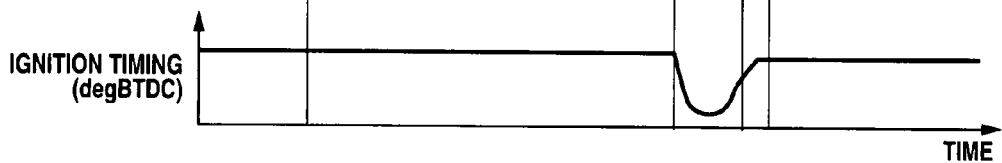
Figure 5A:
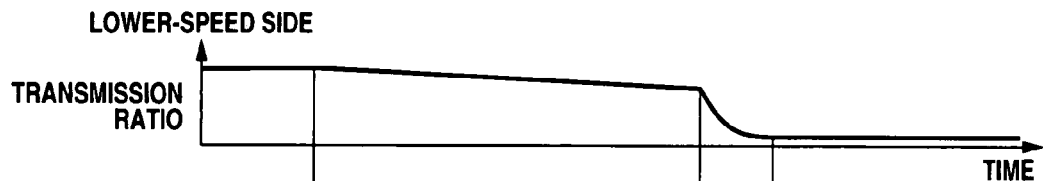
FIGS. 5A-5G are operational time charts showing disadvantages brought with no execution of the engine output control shown in FIG. 2.
Figure 5B:
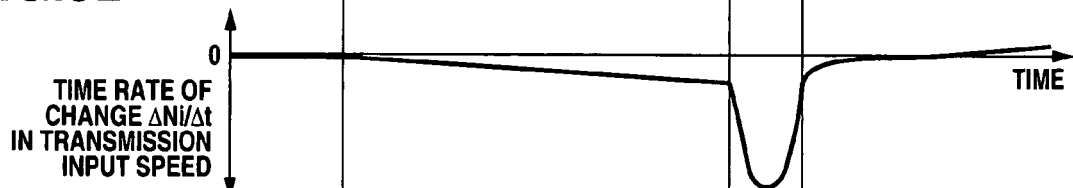
Figure 5C:
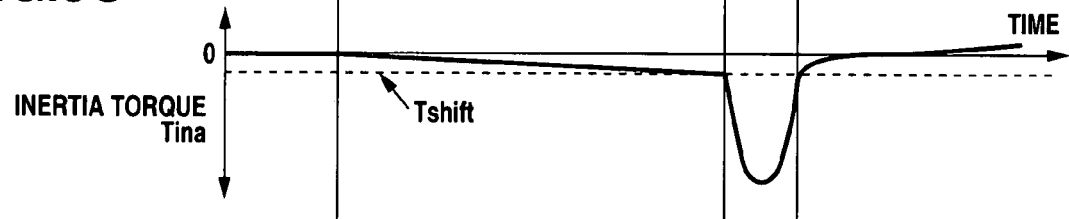
Figure 5D:
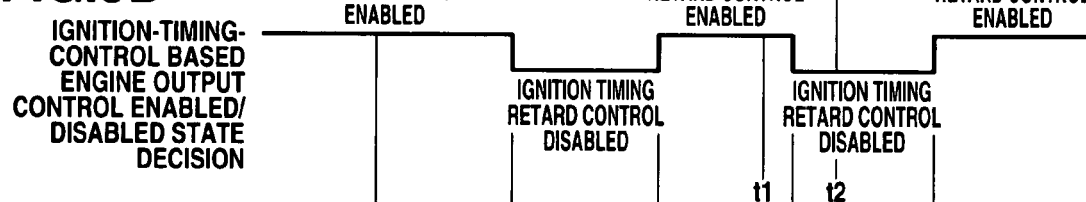
Figure 5E:
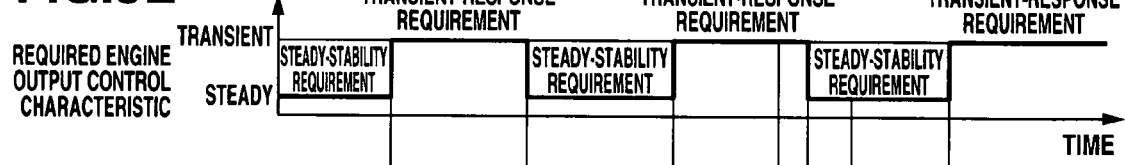
Figure 5F:
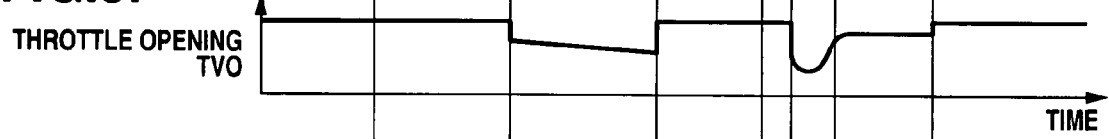
Figure 5G:
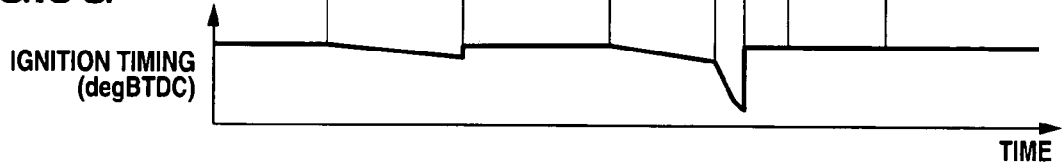

As can be seen from the ignition-timing-control based engine output control enabled/disabled state decision of FIG. 4D, suppose that step S1 of FIG. 2 has decided that the ignition-timing-control based engine output control (the $2^{nd}$ engine output control) is enabled (usable for the current power-train operating condition) until the time t4 after the time t3. In this case, step S5 of FIG. 2 is executed only during the time interval (t1-t3) from t1 to t3. In other words, step S2 of FIG. 2 is executed before shifting-start decision time t1 and after time-expired point t3. Thus, as can be seen from the variation in throttle opening TVO in FIG. 4F, belt-protection engine output control is performed by way of the $1^{st}$ engine output control system (the throttle opening control system) having a superior steady stability. On the other hand, as can be seen from the ignition timing retard characteristic curve of FIG. 4G, shift-response-improvement engine output control is performed by way of the $2^{nd}$ engine output control system (the ignition timing control system) having a superior transient control responsiveness. Therefore, it is possible to high-dimensionally reconcile or balance belt-protection engine output control and shift-response-control engine output control.

Additionally, the control apparatus of the embodiment of FIG. 2 determines that the point of time t1 of FIGS. 4A-4G when the shifting-period inertia torque Tina becomes greater than or equal to preset shifting-decision threshold value Tshift, that is, when Tina≧Tshift, is the shift starting point, and also determines that the point of time t2 of FIGS. 4A-4G when the shifting-period inertia torque Tina becomes less than preset shifting-decision threshold value Tshift, is the shift termination point. Thus, the control apparatus of the embodiment can provide the following operation and effects.

Continuously variable transmission 2 automatically shifts responsively to a slight accelerator-pedal depression/release (a slight accelerator work) and a slight vehicle-speed change in order to continuously vary a transmission ratio. Assuming that a shift, caused by a slight accelerator-pedal depression/release and/or a slight vehicle speed change, operates as a factor that initiates or triggers shift response control, there are some disadvantages as hereinafter described in detail in reference to the time charts shown in FIGS. 5A-5G under the same conditions concerning the transmission ratio (Ni/No), time rate of change $\Delta Ni/\Delta t$ in transmission input speed Ni, and inertia torque Tina, as FIGS. 4A-4C. In other words, assuming that the shift-response-improvement engine output control is executed by the ignition-timing-control based engine output control responsively to a transient-response requirement generated from a point of time before shifting-start decision time t1, the following disadvantages occur.

That is, owing to transient-response requirements generated before shifting-start decision time t1, the execution time duration of $2^{nd}$ engine output control system tends to become long, thereby causing an excessive catalyst temperature rise. As a result, the ignition-timing-control based engine output control mode becomes switched from its enabled state to its disabled state (or its inhibited state) soon. This means undesirable hunting of the ignition-timing-control based engine output control system. Switching to the throttle-opening-control based shift response control mode occurs, each time the ignition-timing-control based engine output control mode is switched to its disabled state. This leads to the occurrence of shift shocks. As a result of this, the ignition-timing-control based engine output control suited to shift speed control cannot be satisfactorily performed during the important shifting period t1-t2. Thus, it is impossible to high-dimensionally reconcile or balance belt-protection engine output control and shift-response-improvement engine output control.

In contrast, according to the control apparatus of the embodiment, as explained previously in reference to FIGS. 4A-4G, the processor (i.e., step S3 of FIG. 2) of the transmission controller determines the point of time t1 when the shifting-period inertia torque Tina becomes greater than or equal to preset shifting-decision threshold value Tshift (in other words, when the rate of change in transmission ratio becomes above a predetermined value), as a shift starting point. Additionally, the processor (i.e., step S3 of FIG. 2) of the transmission controller determines the point of time t2 when the shifting-period inertia torque Tina becomes less than preset shifting-decision threshold value Tshift, as a shift termination point.

Thus, there is a less tendency for shift speed control to be undesirably executed by the ignition-timing-control based engine output control system at a certain time point before shifting-start decision time t1, thereby eliminating the previously-noted undesirable hunting, and consequently suppressing or preventing the occurrence of shifting shocks. That is, it is possible to certainly execute transient shift speed control by the ignition-timing-control based engine output control system during the shifting period t1-t2. Thus, the control apparatus of the embodiment can high-dimensionally reconcile or balance belt-protection engine output control and shift-response-improvement engine output control.

Furthermore, in the shown embodiment, the shift response control, executed by the ignition-timing-control based engine output control system, is continuously executed until the time-expired point t3 of FIGS. 4A-4G when set time TMs has expired from shifting-termination decision time t2, without terminating the ignition-timing-control based shift response control immediately at shifting-termination decision time t2. Therefore, it is possible to more certainly avoid the previously-noted hunting phenomenon, thus more effectively reducing or suppressing shift shocks, occurring owing to frequent switching between the ignition-timing-control based engine output control mode and the throttle-opening-control based shift response control.

Figure 6:
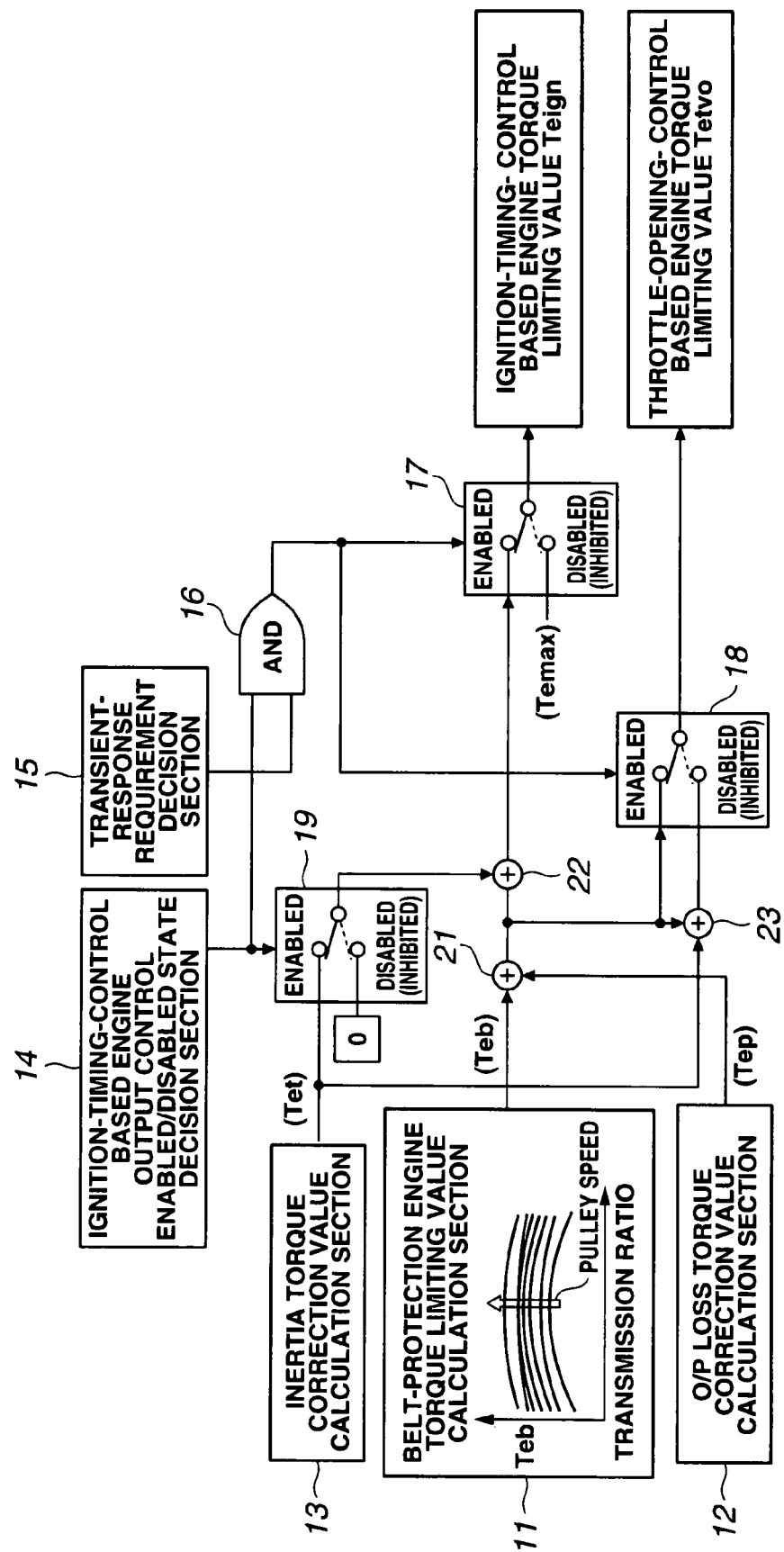
FIG. 6 is a logic circuit diagram in the case of the transmission controller incorporated in the engine output control apparatus of the embodiment shown in FIG. 1, constructed by a logic circuit rather than a microcomputer.

As discussed above, transmission controller 6 incorporated in the control apparatus of the embodiment comprises a microcomputer capable of executing the control program shown in FIG. 2 to ensure the aforementioned system operation and effects. Instead of using such a microcomputer, transmission controller 6 may be constructed by a logic circuit as shown in FIG. 6. In FIG. 6, the block denoted by reference sign 11 is a belt-protection engine torque limiting value calculation section, the block denoted by reference sign 12 is a shift-control oil pump (O/P) loss torque correction value calculation section, and the block denoted by reference sign 13 is an inertia torque correction value calculation section.

Belt-protection engine torque limiting value calculation section 11 arithmetically calculates or retrieves, based on the transmission ratio (the pulley ratio) and pulley speed, engine torque limiting value Teb for automatic-transmission protection (i.e., for belt-slip prevention of belt-drive CVT 2) Teb, from a predetermined transmission-ratio versus engine torque limiting value Teb characteristic map.

Oil pump loss torque correction value calculation section 12 calculates oil pump (O/P) loss torque correction value Tep for loss torque occurring within the shift-control oil pump.

Inertia torque correction value calculation section 13 calculates inertia torque correction value Tet needed to control a shift speed (a shift response) by cancellation (offset) of inertia torque Tina generated during shifting.

In FIG. 6, the block denoted by reference sign 14 is an ignition-timing-control based engine output control enabled/disabled state decision section provided for determining, based on the current power-train operating condition, whether the ignition-timing-control based engine output control is enabled or disabled. When it is determined that the current power-train operating condition corresponds to the ignition-timing-control based engine output control system enabled state, ignition-timing-control based engine output control enabled/disabled state decision section 14 generates a high-level output signal (i.e., an ON signal). Conversely when it is determined that the current power-train operating condition corresponds to the ignition-timing-control based engine output control system disabled state, ignition-timing-control based engine output control enabled/disabled state decision section 14 generates a low-level output signal (i.e., an OFF signal or a "0" output).

Figure 13:
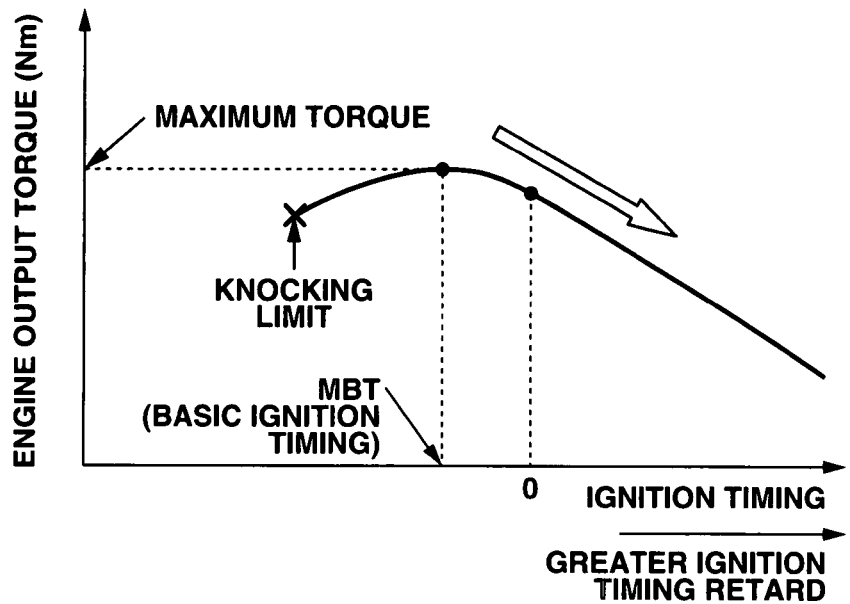
FIG. 13 is the ignition-timing versus engine-torque characteristic curve illustrating the general relationship between ignition timing retard rate and engine output torque.
Figure 14:
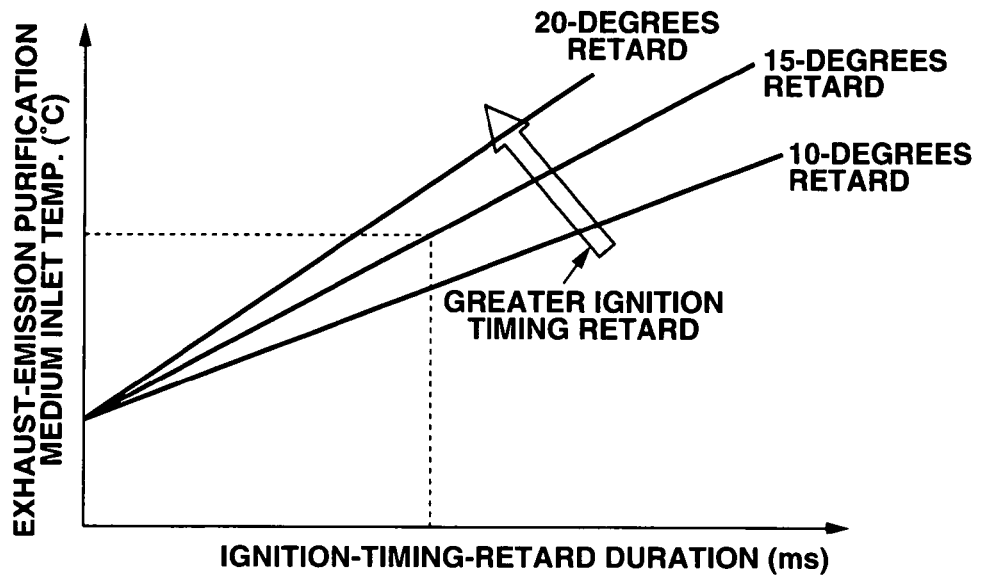
FIG. 14 is the characteristic diagram illustrating the general relationship among ignition-timing-retard duration, exhaust-emission purification medium inlet temperature, and ignition timing retard rate.

As described previously in reference to the characteristic curves shown in FIGS. 13-14, assuming that the engine output control fully depends on ignition timing control, there is a risk of an early exhaust gas purification catalyst deterioration occurring owing to a catalyst temperature rise arising from ignition timing retardation. Such a catalyst deterioration tendency becomes remarkable, as the ignition timing retard rate increases and/or as the ignition-timing-retard control execution time duration lengthens. For the reasons discussed above, in determining the ignition-timing-control based engine output control enabled/disabled state, such a check for the operating condition suited to the use of the $2^{nd}$ engine output control system based on ignition timing control is made based on the ignition-timing-retard duration and the ignition timing retard rate.

In FIG. 6, the block denoted by reference sign 15 is a transient-response requirement decision section. Transient-response requirement decision section 15 determines that shift speed control (shift response control) should be executed by way of the $2^{nd}$ engine output control system based on ignition timing control having a high engine-output-control responsiveness during a time interval from a shift starting point (corresponding to shifting-start decision time t1 when the shifting-period inertia torque Tina becomes greater than or equal to preset shifting-decision threshold value Tshift) to a time-expired point t3 when set time TMs has expired from a shifting termination point (corresponding to shifting-termination decision time t2 when the shifting-period inertia torque Tina becomes less than preset shifting-decision threshold value Tshift). Thus, during the time interval t1-t3 from the shift starting point t1 to the time-expired point t3, transient-response requirement decision section 15 generates a high-level output signal (i.e., an ON signal) to enable the ignition-timing-control based shift speed control. Before the shift starting point t1 or after the time-expired point t3, transient-response requirement decision section 15 generates a low-level output signal (i.e., an OFF signal or a "0" output) to disable (or inhibit) the ignition-timing-control based shift speed control.

When the levels of output signals from decision sections 14-15 are both high, that is, when the current operating condition is suited to the ignition-timing-control based engine output control system and shift speed control (shift response control) should be executed by way of the ignition-timing-control based engine output control system, an AND gate 16 outputs a high-level output signal (i.e., an enabling signal) to switch two switching elements 17-18 to their enabling positions indicated by the solid lines in FIG. 6. Conversely when the output signal level from decision section 14 is low or the output signal level from decision section 15 is low, that is, when the positive decisions of two decision sections 14-15 are not satisfied simultaneously, AND gate 16 outputs a low-level output signal (i.e., a disabling signal) to switch switching elements 17-18 to their disabling positions (inhibiting positions) indicated by the phantom lines in FIG. 6.

Additionally, when the output signal level from decision section 14 is high, that is, when the current operating condition is suited to the ignition-timing-control based engine output control system, a switching element 19 is switched to its enabling position indicated by the solid line in FIG. 6. Conversely when the output signal level from decision section 14 is low, that is, when the current operating condition is unsuited to the ignition-timing-control based engine output control system, switching element 19 is switched to its disabling position (inhibiting position) indicated by the phantom line in FIG. 6.

A first adder 21 generates a first adder signal corresponding to the summed value (Teb+Tep) of belt-protection engine torque limiting value Teb and O/P loss torque correction value Tep. A second adder 22 generates a second adder signal corresponding to the summed value (Teb+Tep+Tet or Teb+Tep) of the $1^{st}$ adder signal value (Teb+Tep) and an output signal value (Tet or "0") from switching element 19. A third adder 23 generates a third adder signal corresponding to the summed value (Teb+Tep+Tet) of the $1^{st}$ adder signal value (Teb+Tep) and inertia torque correction value Tet. The output terminal of $2^{nd}$ adder 22 is connected to the enabling terminal of switching element 17. On the other hand, outputtable maximum torque value Temax is input into the inhibiting terminal of switching element 17.

The enabling terminal of switching element 18 is connected to the output terminal of $1^{st}$ adder 21, whereas the inhibiting terminal of switching element 18 is connected to the output terminal of the $3^{rd}$ adder.

Inertia torque correction value Tet is input into the enabling terminal of switching element 19.

According to the logic circuit of FIG. 6, when the output signal levels from decision sections 14-15 are both high, that is, when the current operating condition is suited to the ignition-timing-control based engine output control system and shift speed control (shift response control) should be executed by way of the ignition-timing-control based engine output control system, all of switching elements 17-19 are switched to their enabling positions indicated by the solid lines in FIG. 6. Thus, engine torque limiting value Tetvo for the $1^{st}$ engine output control system based on throttle opening control is set to the summed value (Teb+Tep) of belt-protection engine torque limiting value Teb and O/P loss torque correction value Tep, that is, Tetvo=Teb+Tep. Additionally, engine torque limiting value Teign for the $2^{nd}$ engine output control system based on ignition timing control is set to the summed value (Teb+Tep+Tet) of belt-protection engine torque limiting value Teb, O/P loss torque correction value Tep, and shift-speed-control (shift-response-control) inertia torque correction value Tet, that is, Teign=Teb+Tep+Tet.

Conversely when either one of the output signal levels from decision sections 14-15 is low (an OFF signal level representing "0" output), that is, when shift speed control (shift response control) should not be executed by way of the ignition-timing-control based engine output control system even under the current operating condition suited to the ignition-timing-control based engine output control system or when the current operating condition is unsuited to the ignition-timing-control based engine output control system even if shift speed control (shift response control) should be executed by way of the ignition-timing-control based engine output control system, switching elements 17-18 are switched to their inhibiting positions indicated by the phantom lines in FIG. 6. Thus, engine torque limiting value Tetvo for the $1^{st}$ engine output control system based on throttle opening control is set to the summed value (Teb+Tep+Tet) of belt-protection engine torque limiting value Teb, O/P loss torque correction value Tep, and shift-speed-control (shift-response-control) inertia torque correction value Tet, that is, Tetvo=Teb+Tep+Tet. Additionally, engine torque limiting value Teign for the $2^{nd}$ engine output control system based on ignition timing control is set to the outputtable maximum torque value Temax, so as to actually inhibit engine torque limiting action based on ignition timing control.

As set forth above, in a similar manner to transmission controller 6 constructed by the microcomputer executing the control program of FIG. 2, transmission controller 6 constructed by the logic circuit of FIG. 6 can determine engine torque limiting value Tetvo for the $1^{st}$ engine output control system based on throttle opening control and engine torque limiting value Teign for the $2^{nd}$ engine output control system based on ignition timing control. That is, transmission controller 6 having the logic circuit of FIG. 6 can provide the same operation and effects as described previously.

Figure 7:
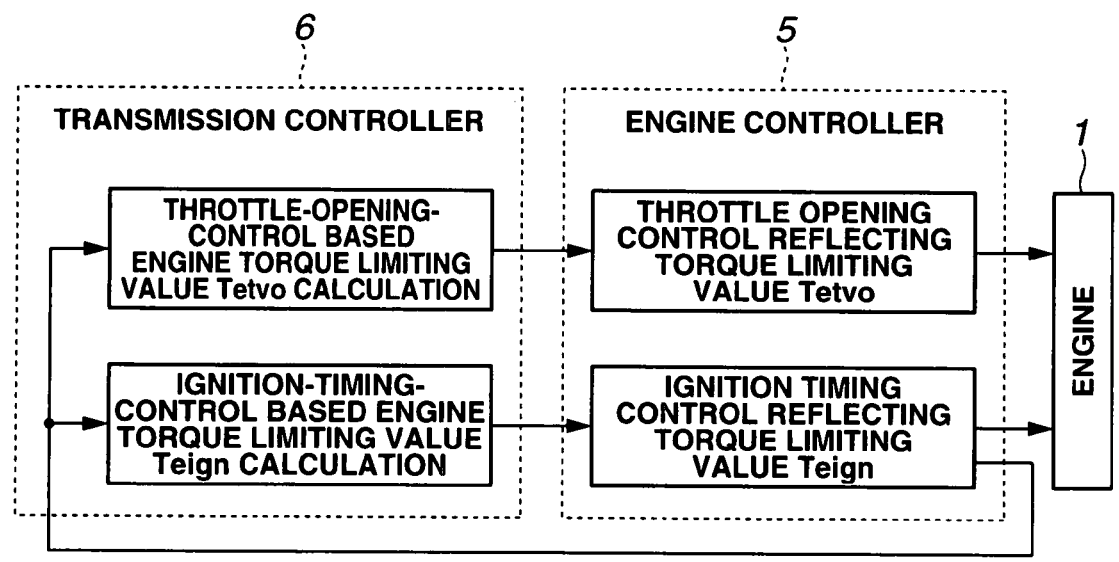
FIG. 7 is a functional block diagram showing altered functions executed by the engine output control apparatus of the embodiment.

Referring now to FIG. 7, there is shown the functional block diagram explaining several functions executed within transmission controller 6 and engine controller 5 incorporated in the engine output control apparatus of the embodiment. As clearly shown in FIG. 7, within transmission controller 6, engine torque limiting value Tetvo for the $1^{st}$ engine output control system based on throttle opening control is calculated, and also engine torque limiting value Teign for the $2^{nd}$ engine output control system based on ignition timing control is calculated. The calculated engine torque limiting values Tetvo and Teign are commanded from transmission controller 6 to engine controller 5.

Engine controller 5 is responsive to the command signal indicative of the calculated engine torque limiting value Tetvo, for performing throttle opening control for engine 1, reflecting the calculated engine torque limiting value Tetvo for the $1^{st}$ engine output control system based on throttle opening control. Additionally, engine controller 5 is responsive to the command signal indicative of the calculated engine torque limiting value Teign, for performing ignition timing control for engine 1, reflecting the calculated engine torque limiting value Teign for the $2^{nd}$ engine output control system based on ignition timing control.

The previously-described engine output control apparatus of the embodiment is exemplified in a dual engine output control system constructed by the ignition-timing-control based engine output control system having a superior transient engine-output-control responsiveness and the throttle-opening-control based engine output control system having a superior steady stability. It will be appreciated that the invention is not limited to the particular embodiments shown and described herein, but that various changes and modifications may be made. For instance, the other three engine output control systems, namely, the $3^{rd}$ engine output control system based on fuel-supply rate control, the $4^{th}$ engine output control system based on intake-and-exhaust valve lift characteristic control, and the $5^{th}$ engine output control system based on effective compression ratio control (intake-and-exhaust valve timing control), each having an intermediate engine-output-control responsiveness (or an intermediate control characteristic) between the throttle-opening-control based engine output control system of a low engine torque control responsiveness and the ignition-timing-control based engine output control system of a high engine torque control responsiveness, may be combined arbitrarily with the ignition-timing-control based engine output control system having a superior transient engine output control responsiveness and/or the throttle-opening-control based engine output control system having a superior steady stability.

Figure 8:
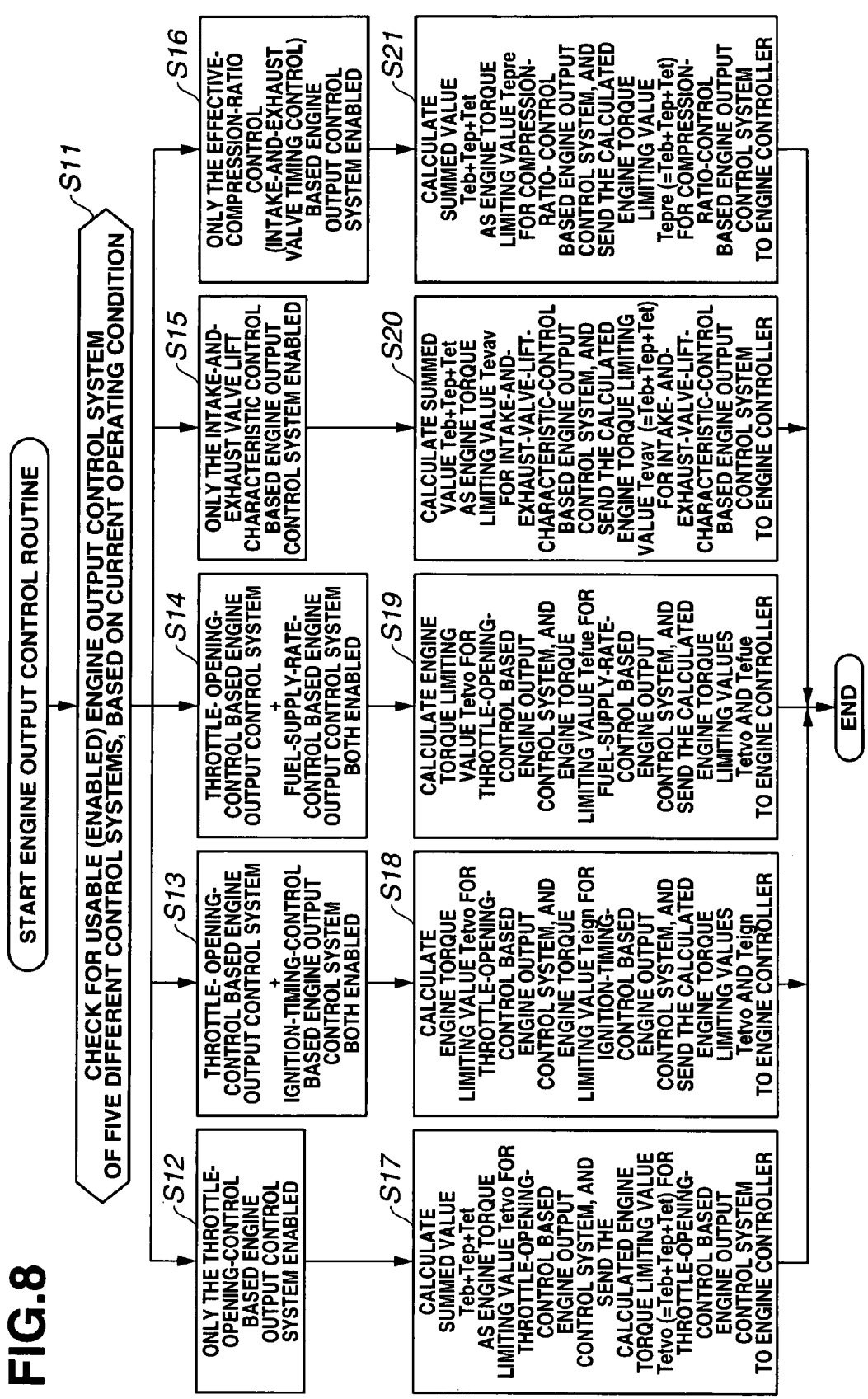
FIG. 8 is a flow chart showing an engine output control routine (an engine output limiting control program) of a modified engine output control apparatus selectively using one or more usable systems of five different engine output control systems.
Figure 9:
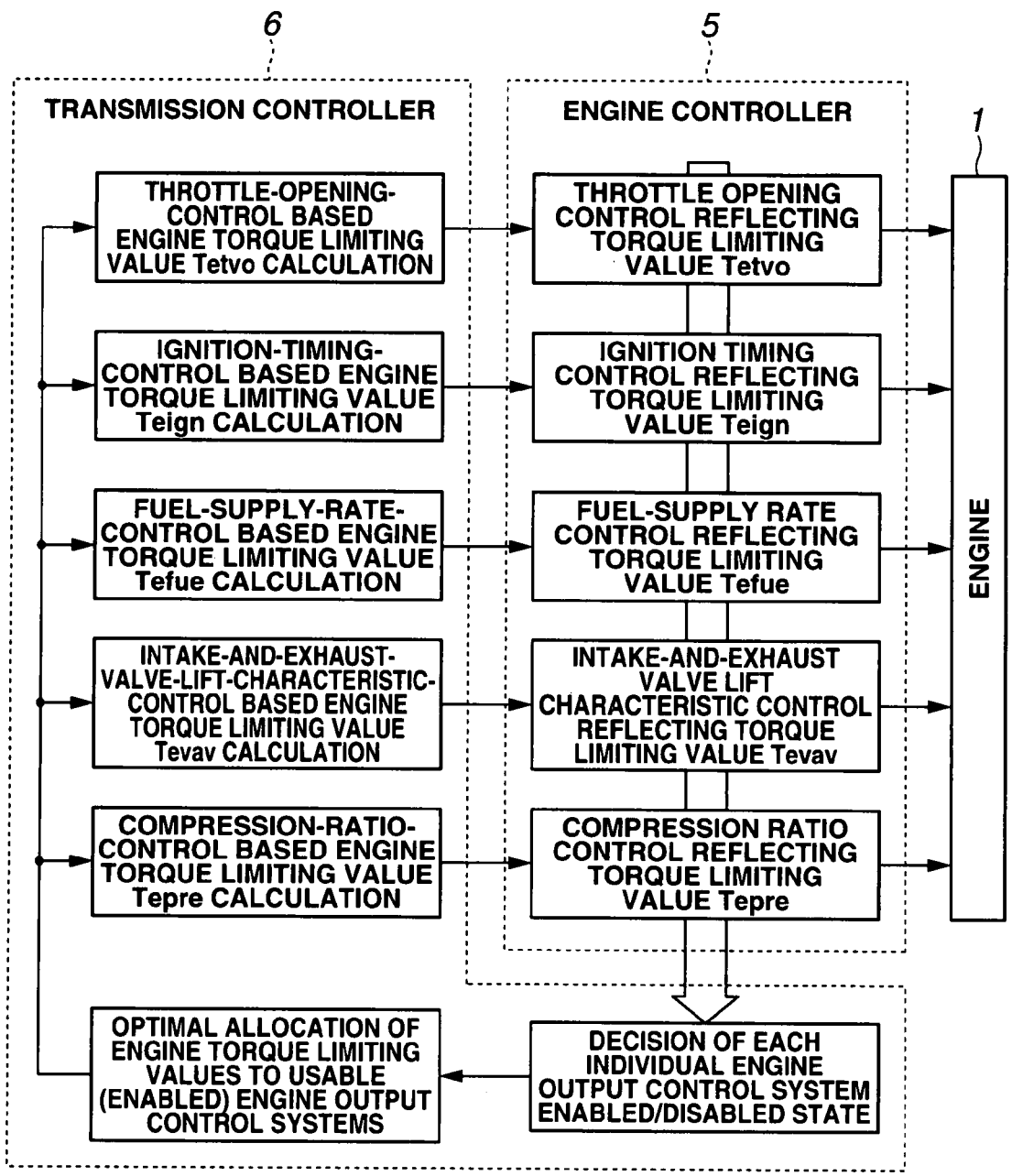
FIG. 9 is a functional block diagram showing altered functions of the engine output control executed by the modified engine output control apparatus of FIG. 8.
Figure 10:
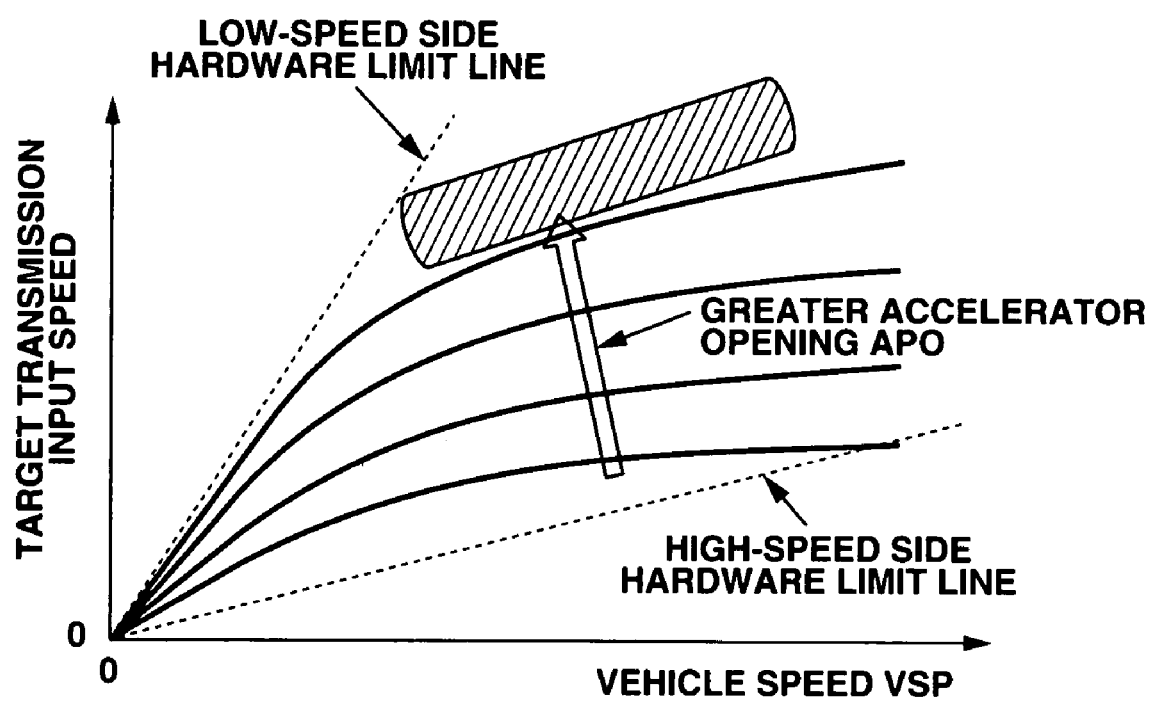
FIG. 10 is the belt-drive CVT shift map illustrating the belt-slip-prevention input torque limiting area in the high load and high speed range.
Figure 12A:
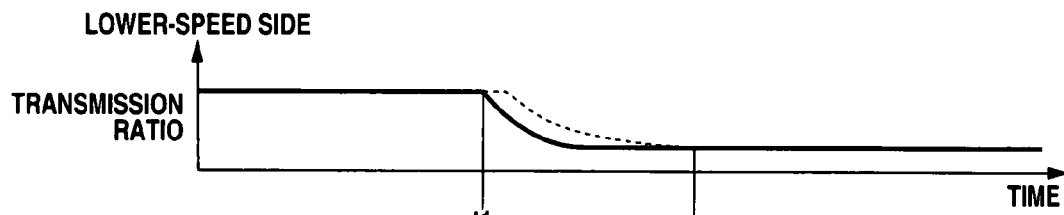
FIGS. 12A-12F are time charts showing several drawbacks occurring during shift-speed-increase engine output control performed by way of throttle opening control as shown in FIGS. 11A-11D.
Figure 12B:
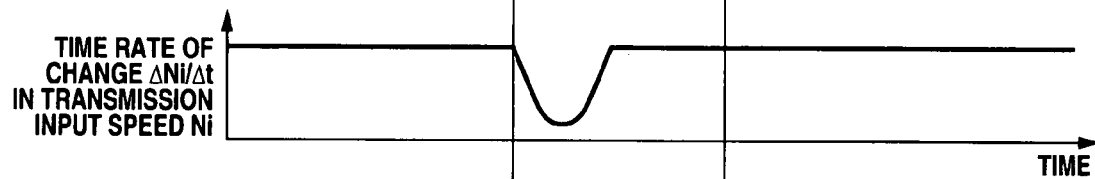
Figure 12C:
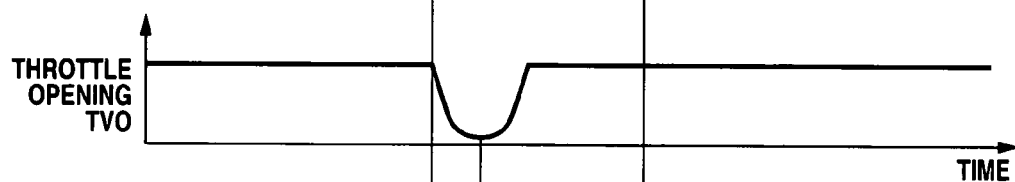
Figure 12D:
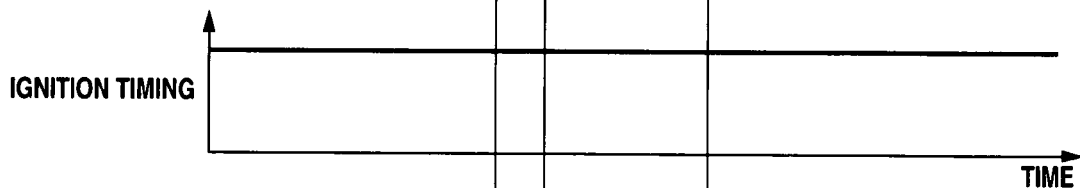
Figure 12E:
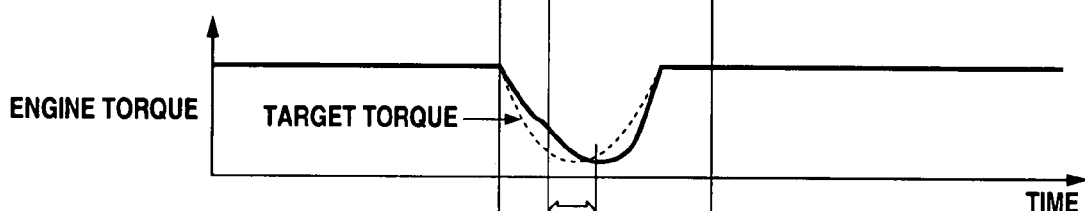
Figure 12F:
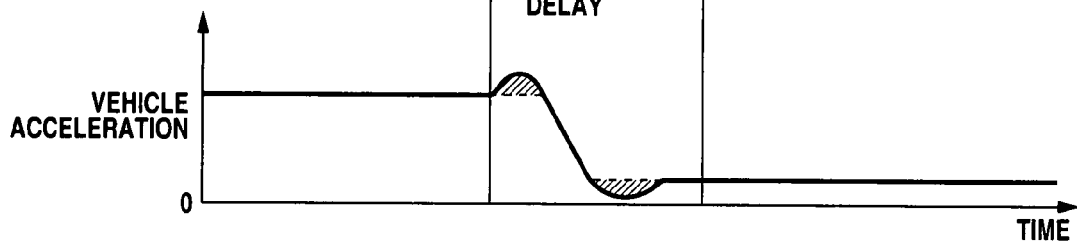

FIG. 8 shows the control program executed by the modified engine output control apparatus utilizing all of the previously-noted five different engine output control systems, and capable of executing engine output control for belt protection (i.e., belt slip prevention) and for shift response control that the invention assumes an aim. FIG. 9 shows the functional block diagram explaining several functions executed within transmission controller 6 and engine controller 5 incorporated in the modified control apparatus of FIG. 8.

In the modified control apparatus utilizing the control program of FIG. 8 instead of using the program of FIG. 2, first, at step S11, a check (a decision) for each individual engine output control system enabled/disabled state is made to specify one or more usable engine output control systems by determining, based on the current power-train operating condition, whether these five different kinds of engine output control systems can be individually used for the aforesaid engine output control to be executed for shift-response-improvement engine output control and for belt-protection (belt-slip-prevention) engine output limiting control.

When it is determined that only the $1^{st}$ engine output control system based on throttle opening control is the usable engine output control system, the routine proceeds from step S11 to step S12.

At step S12, only the $1^{st}$ engine output control system is identified as the usable engine output control system suited to the current operating condition.

When it is determined that the $1^{st}$ engine output control system based on throttle opening control and the $2^{nd}$ engine output control system based on ignition timing control are the usable engine output control systems, the routine proceeds from step S11 to step S13.

At step S13, the dual engine output control system comprised of the 1$^{st}$ and 2$^{nd}$ engine output control systems is identified as the usable engine output control system suited to the current operating condition.

When it is determined that the 1$^{st}$ engine output control system based on throttle opening control and the 3$^{rd}$ engine output control system based on fuel-supply rate control are the usable engine output control systems, the routine proceeds from step S11 to step S14.

At step S14, the dual engine output control system comprised of the 1$^{st}$ and 3$^{rd}$ engine output control systems is identified as the usable engine output control system suited to the current operating condition.

When it is determined that only the 4$^{th}$ engine output control system based on intake-and-exhaust valve lift characteristic control is the usable engine output control system, the routine proceeds from step S11 to step S15.

At step S15, only the 4$^{th}$ engine output control system is identified as the usable engine output control system suited to the current operating condition.

When it is determined that only the 5$^{th}$ engine output control system based on effective compression ratio control (intake-and-exhaust valve timing control) is the usable engine output control system, the routine proceeds from step S11 to step S16.

At step S16, only the 5$^{th}$ engine output control system is identified as the usable engine output control system suited to the current operating condition.

As appreciated, steps S11-S16 serve as a usable engine output control system decision means.

When the processor (i.e., step S12 of FIG. 8) of transmission controller 6 identifies only the 1$^{st}$ engine output control system based on throttle opening control as the usable engine output control system suited to the current operating condition, the routine proceeds from step S12 to step S17.

At step S17, a command signal corresponding to the summed value (Teb+Tep+Tet) of belt-protection engine torque limiting value Teb (the critical torque value or the upper limit of transmittable torque values transmitted through the segmented steel belt of the CVT), 0/P loss torque correction value Tep, and shift-speed-control (shift-response-control) inertia torque correction value Tet is commanded to engine controller 5 as the engine torque limiting value Tetvo for the 1$^{st}$ engine output control system based on throttle opening control.

When the processor (i.e., step S13 of FIG. 8) of transmission controller 6 identifies the 1$^{st}$ engine output control system based on throttle opening control and the 2$^{nd}$ engine output control system based on ignition timing control as the usable engine output control systems suited to the current operating condition, the routine proceeds from step S13 to step S18.

At step S18, engine torque limiting value Tetvo for the 1$^{st}$ engine output control system based on throttle opening control and engine torque limiting value Teign for the 2$^{nd}$ engine output control system based on ignition timing control are both calculated and then command signals corresponding to the respective calculated engine torque limiting values Tetvo and Teign are commanded to engine controller 5. In calculating these engine torque limiting values Tetvo and Teign, the same shifting-state decision as steps S3-S4 is performed, and thereafter, depending on the shifting-state decision result, either the same arithmetic-calculation as step S2 or the same arithmetic-calculation as step S5 is executed to derive engine torque limiting values Tetvo and Teign suited to the current power-train operating condition.

When the processor (i.e., step S14 of FIG. 8) of transmission controller 6 identifies the 1$^{st}$ engine output control system based on throttle opening control and the 3$^{rd}$ engine output control system based on fuel-supply rate control as the usable engine output control systems suited to the current operating condition, the routine proceeds from step S14 to step S19.

At step S19, engine torque limiting value Tetvo for the 1$^{st}$ engine output control system based on throttle opening control and an engine torque limiting value Tefue for the 3$^{rd}$ engine output control system based on fuel-supply rate control are both calculated and then command signals corresponding to the respective calculated engine torque limiting values Tetvo and Tefue are commanded to engine controller 5. In calculating these engine torque limiting values Tetvo and Tefue, the same shifting-state decision as steps S3-S4 is performed, and thereafter, depending on the shifting-state decision result, either arithmetic-calculation similar to step S2 or arithmetic-calculation similar to step S5 is executed to derive engine torque limiting values Tetvo and Tefue suited to the current power-train operating condition. In the arithmetic-calculation similar to step S2 and the arithmetic-calculation similar to step S5, engine torque limiting value Tefue for the 3$^{rd}$ engine output control system based on fuel-supply rate control is substituted for engine torque limiting value Teign for the 2$^{nd}$ engine output control system based on ignition timing control.

When the processor (i.e., step S15 of FIG. 8) of transmission controller 6 identifies only the 4$^{th}$ engine output control system based on intake-and-exhaust valve lift characteristic control as the usable engine output control system suited to the current operating condition, the routine proceeds from step S15 to step S20.

At step S20, a command signal corresponding to the summed value (Teb+Tep+Tet) of belt-protection engine torque limiting value Teb (the critical torque value or the upper limit of transmittable torque values transmitted through the segmented steel belt of the CVT), O/P loss torque correction value Tep, and shift-speed-control (shift-response-control) inertia torque correction value Tet is commanded to engine controller 5 as an engine torque limiting value Tevav for the 4$^{th}$ engine output control system based on intake-and-exhaust valve lift characteristic control.

When the processor (i.e., step S16 of FIG. 8) of transmission controller 6 identifies only the 5$^{th}$ engine output control system based on effective compression ratio control (intake-and-exhaust valve timing control) as the usable engine output control system suited to the current operating condition, the routine proceeds from step S16 to step S21.

At step S21, a command signal corresponding to the summed value (Teb+Tep+Tet) of belt-protection engine torque limiting value Teb (the critical torque value or the upper limit of transmittable torque values transmitted through the segmented steel belt of the CVT), O/P loss torque correction value Tep, and shift-speed-control (shift-response-control) inertia torque correction value Tet is commanded to engine controller 5 as an engine torque limiting value Tepre for the 5$^{th}$ engine output control system based on effective compression ratio control (intake-and-exhaust valve timing control).

Therefore, steps S17-S21 serve as an engine output control system selection means.

Engine controller 5 receives input information about the previously-noted engine torque limiting values calculated through steps S17-S21, to control the selected engine output control systems (the usable or enabled engine output control systems) individually in a manner so as to reflect the calculated engine torque limiting values.

As set forth above, the modified engine output control apparatus utilizing the previously-noted five different engine output control systems can provide the same operation and effects as described previously. Additionally, the modified engine output control apparatus of FIGS. 8-9, enables a wide range of choice from the first to fifth engine output control systems, and thus it is possible to more certainly achieve the same operation and effects as described previously.

As can be appreciated from the functional block diagram of FIG. 9 showing several functions executed by the modified control apparatus of FIG. 8, the following arithmetic operations are made within transmission controller 6.

First, within the processor (i.e., step S11 of FIG. 8) of transmission controller 6, a check (a decision) for each individual engine output control system enabled/disabled state is made to specify one or more usable engine output control systems by determining, based on the current powertrain operating condition, whether these five different kinds of engine output control systems, namely, the throttle-opening-control based engine output control system, the ignition-timing-control based engine output control system, the fuel-supply-rate-control based engine output control system, the intake-and-exhaust-valve-lift-characteristic-control based engine output control system, and the compression-ratio-control based engine output control system can be individually used for the aforesaid engine output control to be executed for shift-response-improvement engine output control and for belt-protection (belt-slip-prevention) engine output limiting control.

Next, the processor of transmission controller 6 determines an optimal allocation of engine output limiting values to the usable (enabled) engine output control systems. On the basis of the determined optimal allocation, throttle-opening-control based engine torque limiting value Tetvo, ignition-timing-control based engine torque limiting value Teign, fuel-supply-rate-control based engine torque limiting value Tefue, intake-and-exhaust-valve-lift-characteristic-control based engine torque limiting value Tevav, and compression-ratio-control based engine torque limiting value Tepre are calculated. These calculated results are send from transmission controller 6 to engine controller 5.

Engine controller 5 executes throttle opening control for engine 1, reflecting the calculated throttle-opening-control based engine torque limiting value Tetvo. Engine controller 5 executes ignition timing control for engine 1, reflecting the calculated ignition-timing-control based engine torque limiting value Teign. Engine controller 5 executes fuel-supply rate control for engine 1, reflecting the calculated fuel-supply-rate-control based engine torque limiting value Tefue. Engine controller 5 executes intake-and-exhaust valve lift characteristic control for engine 1, reflecting the calculated intake-and-exhaust-valve-lift-characteristic-control based engine torque limiting value Tevav. Engine controller 5 executes compression ratio control for engine 1, reflecting the calculated compression-ratio-control based engine torque limiting value Tepre.

In the shown embodiments, the inventive concept is exemplified in a shift speed control (a shift response control) for upshifting of the CVT, and thus the shift speed control (shift response control) during upshifting can be achieved by way of an engine torque decrease control (a so-called engine torque-down control). It will be appreciated that, in the case of a shift speed control (a shift response control) for downshifting of the CVT, the shift speed control (shift response control) during downshifting can be achieved by way of an engine torque increase control (a so-called engine torque-up control). Detailed description for a downshifting-period engine output control, high-dimensionally reconciling belt-protection engine output control and shift-speed-change engine output control, will be omitted, because it seems to be self-explanatory from the above description for an upshifting-period engine output control.

The entire contents of Japanese Patent Application No. 2006-159494 (filed Jun. 8, 2006) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An engine output control apparatus of a power train employing an engine and an automatic transmission, capable of executing engine output control for preventing a torque input exceeding an upper limit of transmittable torque transmitted through the power train and for a shift speed control of the transmission, comprising:
   at least two different kinds of engine output control systems, each of which is executable the engine output control; and
   a controller comprising:
   (a) a usable engine output control system decision circuit provided for making a check for each individual engine output control system enabled/disabled state to specify one or more usable engine output control systems by determining, based on an operating condition of the power train, whether the engine output control systems can be individually used for the engine output control to be executed for excessive torque input prevention engine torque limiting action and for shift response control by which a shift speed increase is achieved during shifting; and
   (b) an engine output control system selection circuit provided for using a first one of the usable engine output control systems having a superior transient response for the engine output control that requires a control response rather than a control stability, and for using a second one of the usable engine output control systems having a superior steady-state stability for the engine output control that requires the control stability rather than the control response.

2. The engine output control apparatus as claimed in claim 1, wherein:
   the different kinds of engine output control systems comprise at least a throttle opening control system having the superior steady-state stability, and an ignition timing control system having the superior transient response.

3. The engine output control apparatus as claimed in claim 1, wherein:
   when the usable engine output control system decision circuit determines that the engine output control system having a superior transient response is disabled, the engine output control system selection circuit commands the engine output control system having a superior steady-state stability to execute both the engine output control for shift response control and the engine output control for excessive torque input prevention engine torque limiting action; and when the usable engine output control system decision circuit determines that the engine output control system having the superior transient response is enabled, the engine output control system selection circuit commands the engine output control system having the superior transient response to execute the engine output control for shift response control, and commands the engine output control system having the superior steady-state stability to execute the engine output control for excessive torque input prevention engine torque limiting action.

4. The engine output control apparatus as claimed in claim 3, wherein:

the engine output control for shift response control is executed during a time length during which a time rate of change in a transmission ratio of the automatic transmission is greater than or equal to a preset threshold value.

5. The engine output control apparatus as claimed in claim 4, wherein:

the engine output control for shift response control is continuously executed for a predetermined time interval after a state transition from a state where the time rate of change in the transmission ratio is greater than or equal to the preset threshold value to a state where the time rate of change in the transmission ratio is less than the preset threshold value occurs.

6. The engine output control apparatus as claimed in claim 1, wherein:

the different kinds of engine output control systems comprises:
(i) a throttle opening control system having the superior steady-state stability;
(ii) an ignition timing control system having the superior transient response; and
(iii) at least one of a fuel-supply rate control system, an intake-and-exhaust valve lift characteristic control system, and an effective compression ratio control system, each having an intermediate control characteristic between the throttle opening control system and the ignition timing control system.

7. An engine output control apparatus of a power train employing an engine and an automatic transmission, capable of executing engine output control for preventing a torque input exceeding an upper limit of transmittable torque transmitted through the power train and for a shift speed control of the transmission, comprising:

at least two different kinds of engine output control systems, each of which is executable the engine output control; and a controller comprising:
(a) usable engine output control system decision means for making a check for each individual engine output control system enabled/disabled state to specify one or more usable engine output control systems by determining, based on an operating condition of the power train, whether the engine output control systems can be individually used for the engine output control to be executed for excessive torque input prevention engine torque limiting action and for shift response control by which a shift speed increase is achieved during shifting; and
(b) engine output control system selection means for using a first one of the usable engine output control systems having a superior transient response for the engine output control that requires a control response rather than a control stability, and for using a second one of the usable engine output control systems having a superior steady-state stability for the engine output control that requires the control stability rather than the control response.

8. A method of limiting torque transmitted through a power train employing an engine and an automatic transmission, for executing engine output control for excessive torque input prevention engine torque limiting action that prevents a torque input exceeding an upper limit of transmittable torque transmitted through the power train and for shift response control by which a shift speed increase of the automatic transmission is achieved during shifting, comprising:

providing at least two different kinds of engine output control systems, each of which is executable the engine output control;

making a check for each individual engine output control system enabled/disabled state to specify one or more usable engine output control systems by determining, based on an operating condition of the power train, whether the engine output control systems can be individually used for the engine output control to be executed for excessive torque input prevention engine torque limiting action and for shift response control;

selecting a first one of the usable engine output control systems having a superior transient response as the engine output control system for shift response control; and selecting a second one of the usable engine output control systems having a superior steady-state stability as the engine output control system for excessive torque input prevention engine torque limiting action.

9. A method of limiting torque transmitted through a power train employing an engine and an automatic transmission, for executing engine output control for excessive torque input prevention engine torque limiting action that prevents a torque input exceeding an upper limit of transmittable torque transmitted through the power train and for shift response control by which a shift speed increase of the automatic transmission is achieved during shifting, comprising:

providing at least two different kinds of engine output control systems comprising at least a throttle opening control system having a superior steady-state stability, and an ignition timing control system having a superior transient response;

making a check for an engine output control system enabled/disabled state for the ignition timing control system to determine, based on an operating condition of the power train, whether the ignition timing control system is enabled or disabled for the engine output control to be executed for excessive torque input prevention engine torque limiting action and for shift response control;

commanding the throttle opening control system having the superior steady-state stability to execute both the engine output control for shift response control and the engine output control for excessive torque input prevention engine torque limiting action, when it is determined that the ignition timing control system is disabled; and commanding the ignition timing control system having the superior transient response to execute the engine output control for shift response control, and commanding the throttle opening control system having the superior steady-state stability to execute the engine output control for excessive torque input prevention engine torque limiting action, when it is determined that the ignition timing control system having the superior transient response is enabled.

10. The method as claimed in claim 9, further comprising:
calculating an inertia torque by multiplying a time rate of change in a transmission input speed of the automatic transmission with moments of inertia of rotating masses of the power train;
determining a point of time when the inertia torque becomes greater than or equal to a preset threshold value as a shift starting point, and determining a point of time when the inertia torque becomes less than the preset threshold value as a shift termination point; and
executing the engine output control for shift response control at least during a time length from the shift starting point to the shift termination point.

11. The method as claimed in claim 10, further comprising:
measuring an elapsed time from the shift termination point; and
controlling an execution time of the engine output control for shift response control to execute the engine output control for shift response control during a time length from the shift starting point to a point of time when a set time has expired from the shift termination point.

12. A method of limiting torque transmitted through a power train employing an engine and an automatic transmission, for executing engine output control for excessive torque input prevention engine torque limiting action that prevents a torque input exceeding an upper limit of transmittable torque transmitted through the power train and for shift response control by which a shift speed increase of the automatic transmission is achieved during shifting, comprising:
providing different kinds of engine output control systems comprising a throttle opening control system having a superior steady-state stability, an ignition timing control system having a superior transient response, and at least one of a fuel-supply rate control system, an intake-and-exhaust valve lift characteristic control system, and an effective compression ratio control system, each having an intermediate control characteristic between the throttle opening control system and the ignition timing control system;
making a check for each individual engine output control system enabled/disabled state to specify one or more usable engine output control systems by determining, based on an operating condition of the power train, whether the engine output control systems can be individually used for the engine output control to be executed excessive torque input prevention engine torque limiting action and for shift response control;
commanding the throttle opening control system having the superior steady-state stability to execute both the engine output control for shift response control and the engine output control for excessive torque input prevention engine torque limiting action, when it is determined that only the throttle opening control system is enabled;
commanding the ignition timing control system having the superior transient response to execute the engine output control for shift response control, and commanding the throttle opening control system having the superior steady-state stability to execute the engine output control for excessive torque input prevention engine torque limiting action, when it is determined that the ignition timing control system and the throttle opening control system are both enabled;
commanding the fuel-supply rate control system having the intermediate control characteristic to execute the engine output control for shift response control, and commanding the throttle opening control system having the superior steady-state stability to execute the engine output control for excessive torque input prevention engine torque limiting action, when it is determined that the fuel-supply rate control system and the throttle opening control system are both enabled;
commanding the intake-and-exhaust valve lift characteristic control system having the intermediate control characteristic to execute both the engine output control for shift response control and the engine output control for excessive torque input prevention engine torque limiting action, when it is determined that only the intake-and-exhaust valve lift characteristic control system is enabled; and
commanding the effective compression ratio control system having the intermediate control characteristic to execute both the engine output control for shift response control and the engine output control for excessive torque input prevention engine torque limiting action, when it is determined that only the effective compression ratio control system is enabled.

* * * * *